US008533840B2

(12) United States Patent
Redlich et al.

(10) Patent No.: US 8,533,840 B2
(45) Date of Patent: Sep. 10, 2013

(54) METHOD AND SYSTEM OF QUANTIFYING RISK

(75) Inventors: Ron M. Redlich, Miami Beach, FL (US); Martin A. Nemzow, Miami Beach, FL (US)

(73) Assignee: DigitalDoors, Inc., Miami Beach, FL (US)

( * ) Notice: Subject to any disclaimer, the term of this patent is extended or adjusted under 35 U.S.C. 154(b) by 994 days.

(21) Appl. No.: 10/396,088

(22) Filed: Mar. 25, 2003

(65) Prior Publication Data
US 2004/0193870 A1    Sep. 30, 2004

(51) Int. Cl.
*G06F 21/00* (2013.01)

(52) U.S. Cl.
USPC .............................. 726/25; 707/708

(58) Field of Classification Search
USPC ....... 726/1–3, 5, 18, 22–23, 25–27; 713/165, 713/193; 711/100; 709/215, 225, 312, 230–231; 705/24, 29, 705/37, 404
See application file for complete search history.

(56) References Cited

U.S. PATENT DOCUMENTS

| 5,036,315 | A |   | 7/1991  | Gurley ........................ 340/721 |
|-----------|---|---|---------|----------------------------------------|
| 5,485,474 | A |   | 1/1996  | Rabin ......................... 371/37.1 |
| 5,532,950 | A |   | 7/1996  | Moses                                  |
| 5,539,906 | A | * | 7/1996  | Abraham et al. ................. 707/9 |
| 5,581,682 | A |   | 12/1996 | Anderson et al.                        |
| 5,748,973 | A | * | 5/1998  | Palmer et al. ..................... 704/9 |
| 5,798,950 | A | * | 8/1998  | Fitzgerald ....................... 703/17 |
| 5,832,212 | A |   | 11/1998 | Cragun et al.                          |
| 5,905,980 | A |   | 5/1999  | Masuichi et al. ................. 707/1 |
| 5,915,019 | A | * | 6/1999  | Ginter et al. .................... 705/54 |
| 5,924,090 | A | * | 7/1999  | Krellenstein ..................... 707/5 |
| 5,933,498 | A |   | 8/1999  | Schneck et al. .................. 380/4 |

(Continued)

FOREIGN PATENT DOCUMENTS

WO    WO 00/75779    12/2000

OTHER PUBLICATIONS

Developing an Automatic Hybrid Data and Text System for Downgrading Sensitive Documents, Mikhail J. Atallah, Cerias and Dep. of Computer Science, Victor Cerias, Dep. of English, Interdepartmental Program in Linguistics, and Natural Language Processing Laboratory,pub. Apr. 4, 2000, (12 pgs), mia.raskin@cerias.purdue.edu.

(Continued)

*Primary Examiner* — Darren B Schwartz
*Assistant Examiner* — Leynna Truvan
(74) *Attorney, Agent, or Firm* — Robert C. Kain, Jr.

(57) ABSTRACT

The method of quantifying risk, implemented as a computerized program, quantifies the risk of releasing security sensitive words, data objects, characters or icons which may be part of data subject to analysis (target data). Security words, etc. are categorized, pre-existing data for each category is obtained and the categories (and subsumed pre-existing data) are ranked by risk. The target data is compared to the compiled pre-existing data and a risk output is generated. For unknown or undefined words, an indeterminable category is created and is ranked. The method may include inference engines, and contextual routines to add semantic equivalents and opposites to the critical list. Search engines may be employed to add to the list. A differential rank quantifier is assigned to the security words, etc. which has a different rank than the associated category. Frequency analysis, source analysis and stochastic analysis is also used. The risk output is altered.

139 Claims, 10 Drawing Sheets

(56) References Cited

U.S. PATENT DOCUMENTS

| | | | |
|---|---|---|---|
| 5,960,080 A | 9/1999 | Fahlman | 380/4 |
| 5,996,011 A | 11/1999 | Humes | 709/225 |
| 6,044,375 A | 3/2000 | Shmueli | 707/101 |
| 6,055,544 A | 4/2000 | DeRose et al. | 707/104 |
| 6,070,140 A * | 5/2000 | Tran | 704/275 |
| 6,073,165 A | 6/2000 | Narasimhan et al. | 109/206 |
| 6,078,907 A | 6/2000 | Lamm | 705/40 |
| 6,094,483 A | 7/2000 | Fridrich et al. | 380/28 |
| 6,101,515 A * | 8/2000 | Wical et al. | 715/531 |
| 6,148,342 A | 11/2000 | Ho | 709/225 |
| 6,192,472 B1 | 2/2001 | Garay et al. | 713/165 |
| 6,253,203 B1 | 6/2001 | O'Flaherty | 707/9 |
| 6,301,668 B1 | 10/2001 | Gleichauf | 713/201 |
| 6,389,542 B1 | 5/2002 | Flyntz | 713/201 |
| 6,487,538 B1 | 11/2002 | Gupta | 705/24 |
| 6,598,161 B1 | 7/2003 | Kluttz | 713/166 |
| 6,602,298 B1 | 8/2003 | Kirshenbaum | 715/502.2 |
| 6,611,846 B1 * | 8/2003 | Stoodley | 707/740 |
| 6,662,189 B2 | 12/2003 | Oyanagi | 707/102 |
| 6,714,977 B1 | 3/2004 | Fowler | 709/224 |
| 6,771,290 B1 | 8/2004 | Hoyle | 345/745 |
| 6,778,703 B1 * | 8/2004 | Zlotnick | 382/218 |
| 6,922,696 B1 * | 7/2005 | Lincoln et al. | 707/101 |
| 6,925,454 B2 * | 8/2005 | Lam et al. | 706/45 |
| 6,944,138 B1 * | 9/2005 | Song | 370/310.1 |
| 7,007,301 B2 * | 2/2006 | Crosbie et al. | 726/23 |
| 7,027,055 B2 * | 4/2006 | Anderson et al. | 345/473 |
| 7,031,961 B2 * | 4/2006 | Pitkow et al. | 707/4 |
| 7,032,022 B1 * | 4/2006 | Shanumgam et al. | 709/225 |
| 7,039,700 B2 * | 5/2006 | Saeidi | 709/224 |
| 7,054,268 B1 * | 5/2006 | Parantainen et al. | 370/231 |
| 7,089,428 B2 * | 8/2006 | Farley et al. | 726/22 |
| 7,110,976 B2 * | 9/2006 | Heimermann et al. | 705/37 |
| 7,113,932 B2 * | 9/2006 | Tayebnejad et al. | 706/21 |
| 7,136,877 B2 * | 11/2006 | Volcani et al. | 704/10 |
| 7,188,107 B2 * | 3/2007 | Moon et al. | 707/5 |
| 7,197,479 B1 * | 3/2007 | Franciscus de Heer et al. | 705/27 |
| 7,227,950 B2 * | 6/2007 | Faith et al. | 380/44 |
| 7,240,016 B1 * | 7/2007 | Sturgis et al. | 705/4 |
| 7,305,548 B2 * | 12/2007 | Pierce et al. | 713/155 |
| 7,437,408 B2 * | 10/2008 | Schwartz et al. | 709/204 |
| 7,526,426 B2 * | 4/2009 | Shaw | 704/9 |
| 7,801,896 B2 * | 9/2010 | Szabo | 707/739 |
| 2002/0073313 A1 | 6/2002 | Brown et al. | 713/165 |
| 2002/0116641 A1 | 8/2002 | Mastrianni | 713/201 |
| 2004/0054630 A1 | 3/2004 | Ginter | 705/53 |

OTHER PUBLICATIONS

Natural Language Processing for Information Assurance and Security: An Overview and Implementations, Mikhail J. Atallah, Craig J. McDonough, Victor Raskin, Center for Education and Research in Information Assurance and Security, Pub. Sep. 2000, (15 pgs.), mja, raskin, mcdonoug@cerias.purdue.edu.

High View Automated Declassification System Build to Meet the Needs of Executive Order 12958, dated Apr. 17, 1995 (2 pgs.).

MIMEsweeper—Content Security for E-mail, Web Browsing & Webmail, Nov. 12, 2001.

Cisco IDS Host Sensor Product, Oct. 16, 2001.

Element-Wise XML Encryption, Hiroshi Maruyama and Takeshi Imamura, IBM Research, Tokyo Research Laboratory (4 pages).

Survival Information Storage Systems by Jay J. Wylie, Michael W. Brigrigg, John D. Strunk, Gregory R. Ganger, Han Kiloccote Pradeep K. Khosla (8 pages).

ZD Net Interactive Week—IBS—SSP: XML to Boost Security Integration (1 page).

Myers, A.C. "Mostly-Static Decentralized Information Flow Control" M.I.T. Doctoral Thesis Jan. 1999.

The 1996 book, Applied Cryptogaphy, by Schneier.

The Uniform Resource Locator article "FOLD OC".

Microsoft Word "Learning Microsoft Word 7.0".

Developing an Automatic Hybrid Data and Text System for Downgrading Sensitive Documents, Mikhail J. Atallah, Apr. 24, 2000.

Natural Language Processing for Information Assurance and Security: An Overview and Implementations, Mikhail J. Atallah, Sep. 2000.

HighView Automated Declassification System Build to Meet the Needs of Executive Order 12958, Oct. 28, 2002.

"Secure External References in Multimedia Email Messages" by B. Wiegel, German National Research Center, Mar. 14, 1996.

"Process of Confidential Information in Distributed Systems by Fragmentation" by J. Fabre, Computer Communications 20:177-188, 1997.

Canadian Patent Publication by S. Lanis, CA 2345148, Apr. 6, 2000.

\* cited by examiner

METHOD AND SYSTEM OF QUANTIFYING RISK

The present invention is a method and a system for quantifying the risk of releasing security sensitive words, data objects, data elements, characters or icons, which may be part of data subject to the analysis.

BACKGROUND OF THE INVENTION

Prior art classification of security sensitive documents, data bases and printed documents and other data in both electronic and non-electronic form involved (a) classifying words, terms, ideas, icons or images into one of several security classifications (for example, a simple classification is top secret (TS), secret (S), confidential (C), and not confidential or not classified (NC)); (b) reviewing the target document, and (c) labeling any paragraph having any given security sensitive word, character or icon at the highest level for the security sensitive word, etc. found in that paragraph. With the advent of significant numbers of electronic documents, this crude security implementation is in conflict with certain legislative mandates to share information among wider groups of people and organizations. Examples of these mandates to share information relate to the home land security laws promulgated after the World Trade Center terrorist attack and the disclosure or non-disclosure laws in the healthcare and health insurance industry. With respect to homeland security measures, the law and regulations generally require that lower level security information (S,C data (secret data and confidential data)) be shared widely throughout the law enforcement community, particularly with local enforcement agencies. In contrast, the legislative and agency mandates in the healthcare industry and the health insurance industry mandate that before an individual's healthcare record is shared between companies, organizations, doctors office etc., the individual health record be expunged or sanitized. Generally stated, the healthcare industry mandate is to eliminate personal identifiable information from the healthcare record.

In the two examples discussed above, it is desirable to utilize and implement a risk monitor system or program, which can assess, prior to the release of target data, the degree of risk associated with the release of security sensitive words, data objects, characters or icon which may be part of the target data.

OBJECTS OF THE INVENTION

It is an object of the present invention to provide a method of quantifying the risk of releasing security sensitive words, data objects, characters or icons which may be part of data.

It is another object of the present invention to provide a risk monitor which includes adaptive features, such that the monitor can be automatically modified for changing information.

It is a further object of the present invention to utilze a risk monitor employing statistical analysis (and stochastic and source analysis) for security sensitive words, data objects, characters or icons.

SUMMARY OF THE INVENTION

The method of quantifying risk, which may be implemented as a computerized program in a computer system, quantifies the risk of releasing security sensitive content, represented by sensitive words, data objects, characters, images, audio elements and data elements, or icons which may be part of data subject to the analysis (target data). Security sensitive words, data objects, characters or icons are categorized, pre-existing data for each category is obtained and compiled and the categories are ranked and assigned risk-based rank quantifiers. Since each category contains pre-existing data (and typically the security sensitive words, etc.), the pre-existing data subsumed in each category has an associated rank quantifier. The target data is compared to the compiled pre-existing data and an output is generated representative of all rank quantifiers. For unknown or undefined words, an indeterminable category is created and is assigned a rank quantifier. The risk factor output is modified to represent those indeterminable words. As a further enhancement, the method may include inference engines which add additional security sensitive words, etc. to the original critical word, term, etc. list based upon semantic equivalents and opposites of the originally provided security sensitive words, etc. and/or the categories which include the original security sensitive words, etc. Conceptual and semantic rules are also employed to quantify the risk and identify additional security sensitive words, etc. To further expand the list of security sensitive words or critical information, search engines may be employed on the Internet, an intranet or an extranet to further add to the list of security sensitive words, etc. Another enhancement assigns a differential rank quantifier to the security sensitive words, etc. which differential is different than the rank quantifier assigned to the category containing the security words, etc. In this manner, when the security sensitive words, etc. are found in the target data, a higher risk ranking is assigned to such occurrence, that is, higher than the category ranking containing the same security sensitive words, etc. Frequency analysis of the target data for the security sensitive words, etc. is employed and stochastic analysis is also used. The risk output is altered based upon such analysis.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention is a method and a system for quantifying the risk of releasing security sensitive content represented by sensitive words, data objects, characters, images, audio elements, data elements or icons which may be part of data, sometimes identified herein as target data or data subject to the risk analysis. Target data consists of any type of computerized data structure including files, documents, transaction data, data packets, data transmissions, captured protocol analysis files and data streams. Data streams may be in any format such as raw text, structured textual documents, data records, hierarchical structures, objects structures, metadata, UML, HTTP, TML, SGML, and raw signals. One feature of the present invention is to identify and distinguish data object patterns within a structured or freeform data stream. Once these data object patterns, sometimes called elements, have been identified and distinguished, various actions may result therefrom including a risk analysis, data sharing functions, implementation of security policies, policing privacy guidelines and providing multilevel security access and multilevel privacy access to the target data. Although the term "security sensitive" is used in conjunction with the phrase security sensitive words, data objects, characters or icons, in fact the phrase relates to any type of critical word, symbol, object, character, phrase, image, audio stream or icon which is deemed to be important by the operator or administrator of the system. Clearly, national defense employs a different definition of security sensitive words, etc. as compared with a dealing with a hospital record relative to the care and treatment of a patient. These security sensitive words, etc. include various data objects including symbols, characters, words, addresses, phrases, concepts derived from original security sensitive words, etc. and expanded versions of the same obtained semantically with the use of the thesaurus, synonyms and antonyms thereof and words and terms derived from inference engines and search results (in a complex system). The data objects may also be obtained by random selection, structured data types, templated data types, patterns, wild card patterns and wild card words, phrases, etc., regular or slang expressions, sound bytes, touch tones, images, icons or maps.

Figure 1:
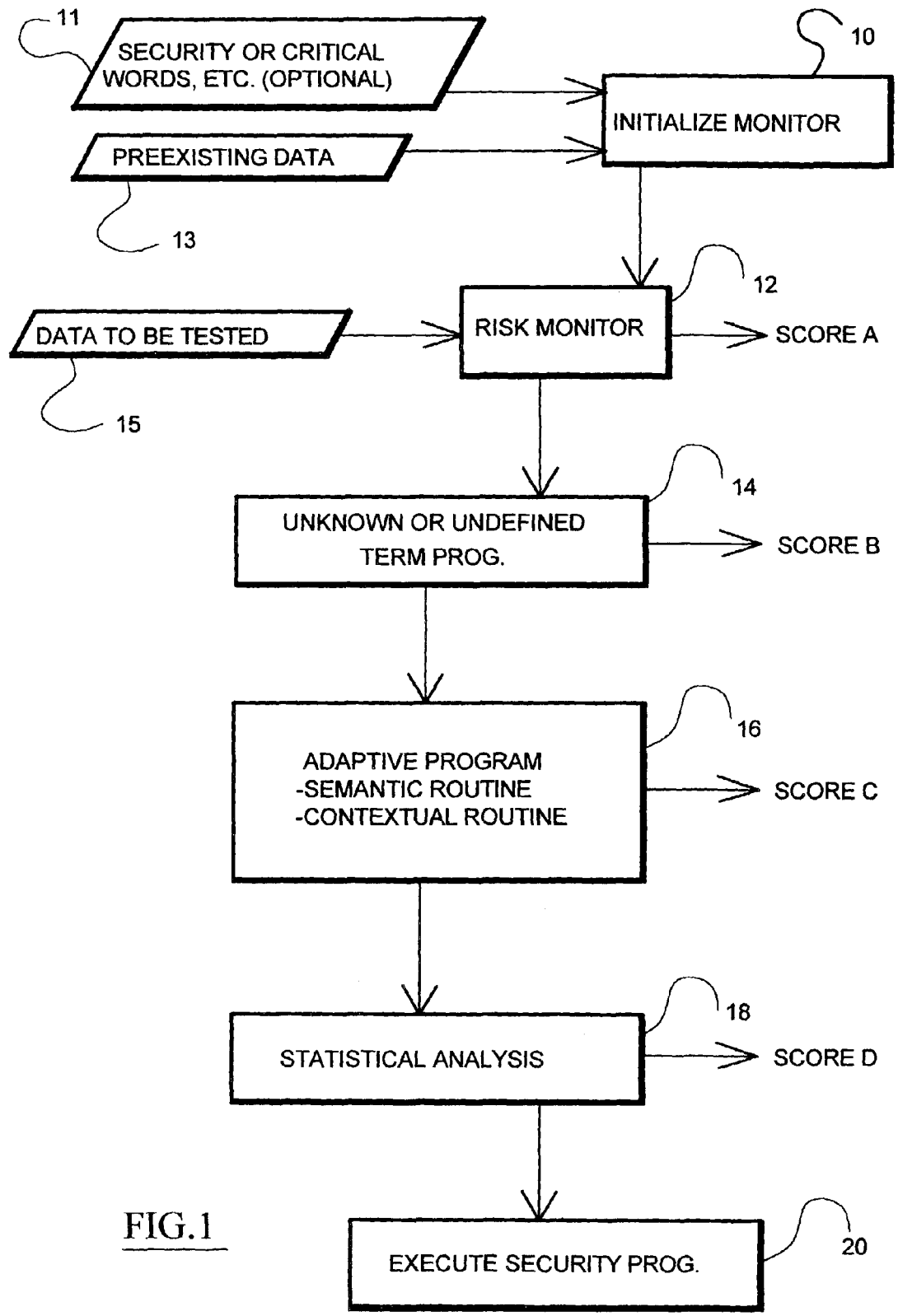
FIG. 1 illustrates a system overview for the risk monitor and its various permutations in accordance with the principles of the present invention.

FIG. 1 diagrammatically illustrates a general system flow chart showing various aspects of the method of quantifying the risk of releasing security sensitive words, etc. Functional block 10 initializes the risk monitor. Typically, the user, operator or administrator has some list of security sensitive words, etc. which are critical to the user or to others, wherein the release of the security sensitive words, etc. is detrimental or inappropriate. In this situation, input function 11 supplies the critical words or security sensitive words, data objects, characters or icons to the initialize monitor function 10. However, in some situations, it is not necessary to supply the initialize monitor function 10 with the precise critical words or data elements. For example, the user may determine that only names of individuals, that is, family names and given names, are critical data that must be identified. In this sense, the user has classified or identified a general category of security sensitive words. In any event, initialize function 10 requires input of pre-existing data represented by input function block 13. The pre-existing data is subsumed or contained in the category. Following the initialization of the risk monitor, risk monitor function block 12 accepts, as an input, data to be tested (input function 15). Risk monitor 12 outputs a risk score or risk quantifier as score A in FIG. 1. Function block 14 tests the data from input 15 for unknown or undefined terms. The risk score is modified based on the number of undefined or unknown terms as indicated by score B. In order to create a more robust risk monitor, an adaptive program function 16 is employed. Adaptive program 16 expands the list of security sensitive words, etc. with semantic routines and contextual rules or routines. The rank or risk quantifier, score C, is appropriately altered. Statistical analysis function 18 also modifies the risk score D based upon frequency analysis and stochastic analysis, among others, of security sensitive words, etc. which may be located in the target data from input block 15. Risk score D is generated from the statistical analysis function 18. Function 20 executes an optional security program on the target data. The disclosures of various security systems described the following patents are incorporated herein by reference thereto: patent application Ser. No. 10/277,196 filed on Oct. 21, 2002 and patent application Ser. No. 10/115,192 filed on May 23, 2002 and Ser. No. 10/155, 525 filed on May 23, 2002, patent application Ser. No. 10/008,209 filed on Dec. 6, 2001 and Ser, No. 10/008,218 filed on Dec. 6, 2001, and patent application Ser. No. 09/916, 397 filed Jul. 27, 2001.

It should be noted that the risk monitor may be automatically initialized or preset by a system administrator. Therefore, the user executing risk monitor function 12 may have significantly less skill in setting up the risk analysis system. Further, functional blocks 14, 16 and 18 may be combined with risk monitor function 12 or maybe separate add-on features. Also, the sequence of the functions 14, 16 and 18 may be reorganized. The sequence of operations of all programs and routines set forth herein is illustrative and better sequences may be employed to achieve higher efficiencies.

The present invention relates to a risk analysis system and a methodology for a personal computer (PC) system, a computer network (LAN or WAN) and an Internet-based system, and computer programs and computer modules and an information processing system to accomplish this risk analysis security system.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. Currently, a software implementation is preferred. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

Abbreviations Table

| | |
|---|---|
| ASP | application service provider - server on a network |
| bd | board |
| cat | category |
| CD-RW | compact disk drive with read/write feature for CD disk |
| comm. | communications, typically telecommunications |
| CPU | central processing unit |
| dr | drive, e.g., computer hard drive |
| I/O | input/output |
| mem | memory |
| prog. | program |
| SL | security level (sometimes SL1 for security level 1, etc.) |
| sub-cat | subcategory |
| sys | system |
| t | time |
| tele-com | telecommunications system or network |
| URL | Uniform Resource Locator, x pointer, or other network locator |

Figure 2:
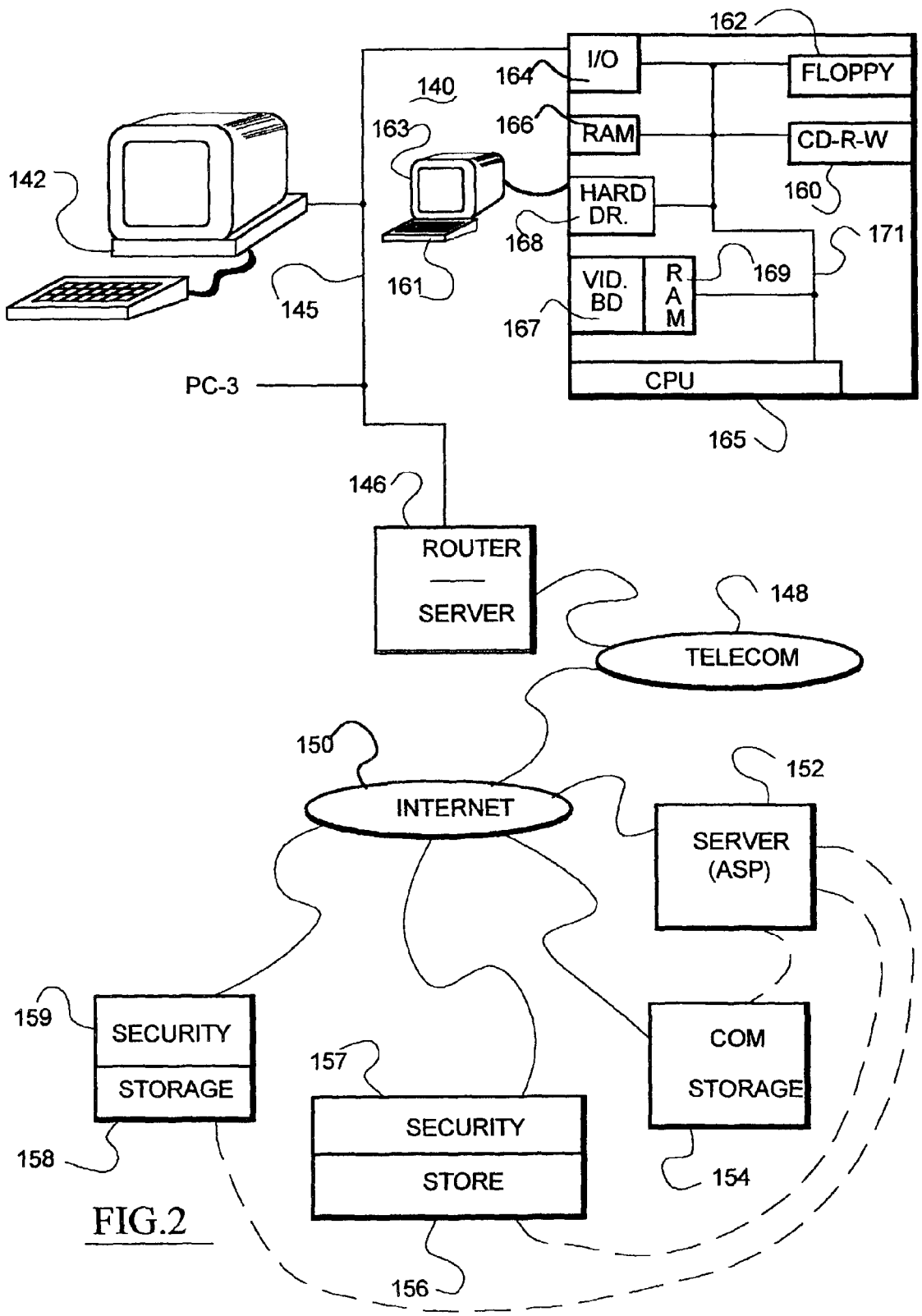
FIG. 2 diagrammatically illustrates a common computer system associated with a secure data storage system.

FIG. 2 diagrammatically illustrates a personal computer or PC computer system 140, a second PC or computer 142, and a third PC-3. PCs 140, 142 and PC-3 are connected together via a network 145 (LAN or WAN) and are also connected to an input/output device 146 that may be generally described as a router or a server to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. In one embodiment, the risk is analyzed with an ASP. Internet 150 also includes various computer memory storage devices such as computer storage 154, computer storage 156 and computer storage 158. Alternatively, ASP 152 can be connected to secure storage 154, 156, 158 behind a firewall. Computer storage enabling the storage of secure or critical data includes a security level clearance module 157. Similarly, storage 158 includes security level clearance module 159. The security limits access to the storage from the casual Internet user.

As stated earlier, the present risk analysis system can be implemented on a single personal computer 140. Typically, PCs include a keyboard or data input device 161, a display 163, a central processing unit CPU 165, a video board 167 having video board memory 169, a fixed disc hard drive 168, a RAM 166, and input/output device 164, a removable memory media floppy drive 162 and a removable compact disk (CD) read-write (CD-RW) device or drive 160. The system may include other removable disk drives, tape drives, or flash memory units. Internal units CPU 165, video board 167, hard drive 168, RAM 166 input/output device 164, floppy drive 162 and CD-ROM device 160 are all coupled together via an internal bus 171. Bus 171 represents a plurality of buses as is known to persons of ordinary skill in the art.

Pre-existing data storage (data catalogs) may be located in distinct memory segments which may be designated in one or more of the following: hard drive 168, memory in a removable disk in floppy drive 162, memory in a removable CD disc in CD-RW device 160, and, to a very limited extend, RAM 166. Alternatively, different portions of hard drive 168 may be used.

In a local area network or wide area network implementation, PC 142 includes memory similar to memory units described in PC 140 and a memory segment may be set aside in PC 142 for the risk analysis. As a further expansion of the present invention, the pre-existing data used in the risk analysis may be stored on computer storage memory 156 via Internet 150, telecommunications system 148 and router/server 146. In this manner, the same data catalogs or template data is stored on hard drive 168 and other data is stored off site, possibly in a secured location. Access to that secured location may be limited via security layer 157. If the user implements an encryption system, the analyzed target data is further secured by the encryption during the transfer from computer 140 through network 145, router/server 146, telecommunication system 148, Internet 150 and ultimately to computer storage I-ext 156.

The present invention may also be embodied utilizing an Application Service Provider on server 152 and in a client-server network. In a client-server environment, server 152 acts as a server generally commanding the operation of client computer 140. Of course, persons of ordinary skill in the art recognize that the server may be located on the local area network 145 rather than being interconnected with Internet 150 as shown in FIG. 2. The claims appended hereto are meant to cover the alternative embodiments.

As an example of a client-server or web-based implementation of the present invention, the user at computer 140 may initialize the risk monitor as described later, and input target data via keyboard 161 or load target data from floppy drive 162 or CD-ROM drive 160 into RAM 166. In any event, whether the data is input via keyboard 161 or copied or accessed from floppy drive 162 or CD-RW drive 160, the data is processed as discussed later. The off site data storage and processing may include activating server 152 and enabling the server to take over the process directly from user 140. In other words, the user at computer 140 could call up the URL of the server 152, the server could request certain user information (user name, password), and would request target data from the client computer to process the risk monitor (and other associated programs) pursuant to input commands selected by the user. The client computer may (a) upload target data and (b) receive the risk factors as output by ASP 152. The server could store data either locally on computer 140 or remotely at computer memories 154, 156. Appropriate security measures, encryption, passwords logs, are employed for security reasons.

It should be noted that computer storage 154, 156 and 158 may be located on the same computer or may be located on different computers spread throughout the Internet. If the storage units are different computers spread throughout the Internet, computer storage 154, 156 and 158 would each have their own URL or Uniform Resource Locator. In any event, the server 152 gathers the information and downloads the information into RAM 166 of computer 140.

The role of server 152 may be expanded or reduced dependent upon the desires of the user and the degree of security necessary. For example, server 152 may only enable storage of compiled pre-existing data. In this limited role, server 152 would require the input of a proper security code and clearance prior to identifying and enabling the download of pre-existing catalog data.

In an expanded mode, server 152 may be involved in processing the target data and returning a risk factor or quantity to the client computer.

Figure 3A:
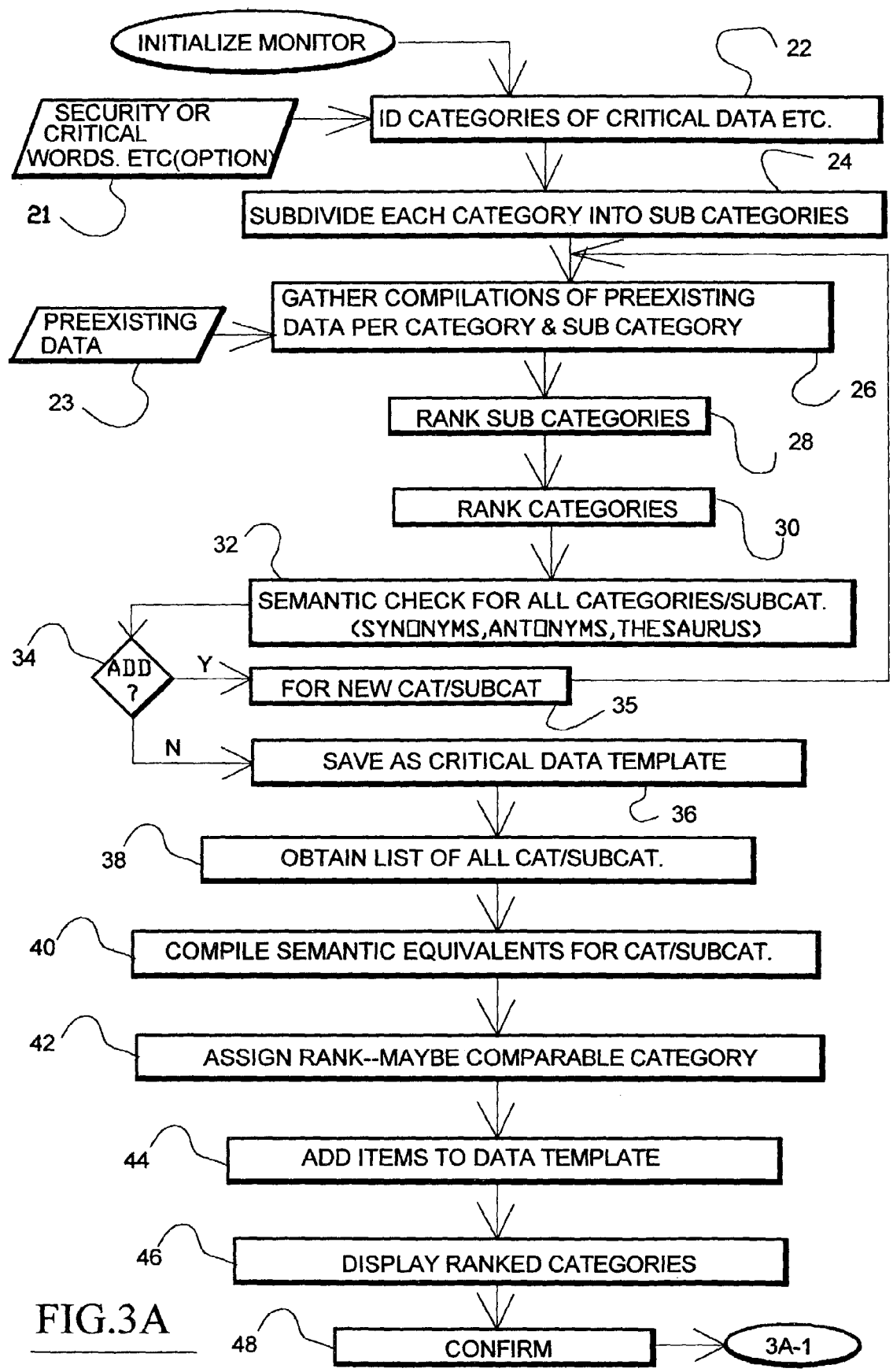
FIGS. 3A and 3B diagrammatically illustrate a flow chart diagram to initialize the risk monitor in accordance with the principles of the present invention.
Figure 3B:
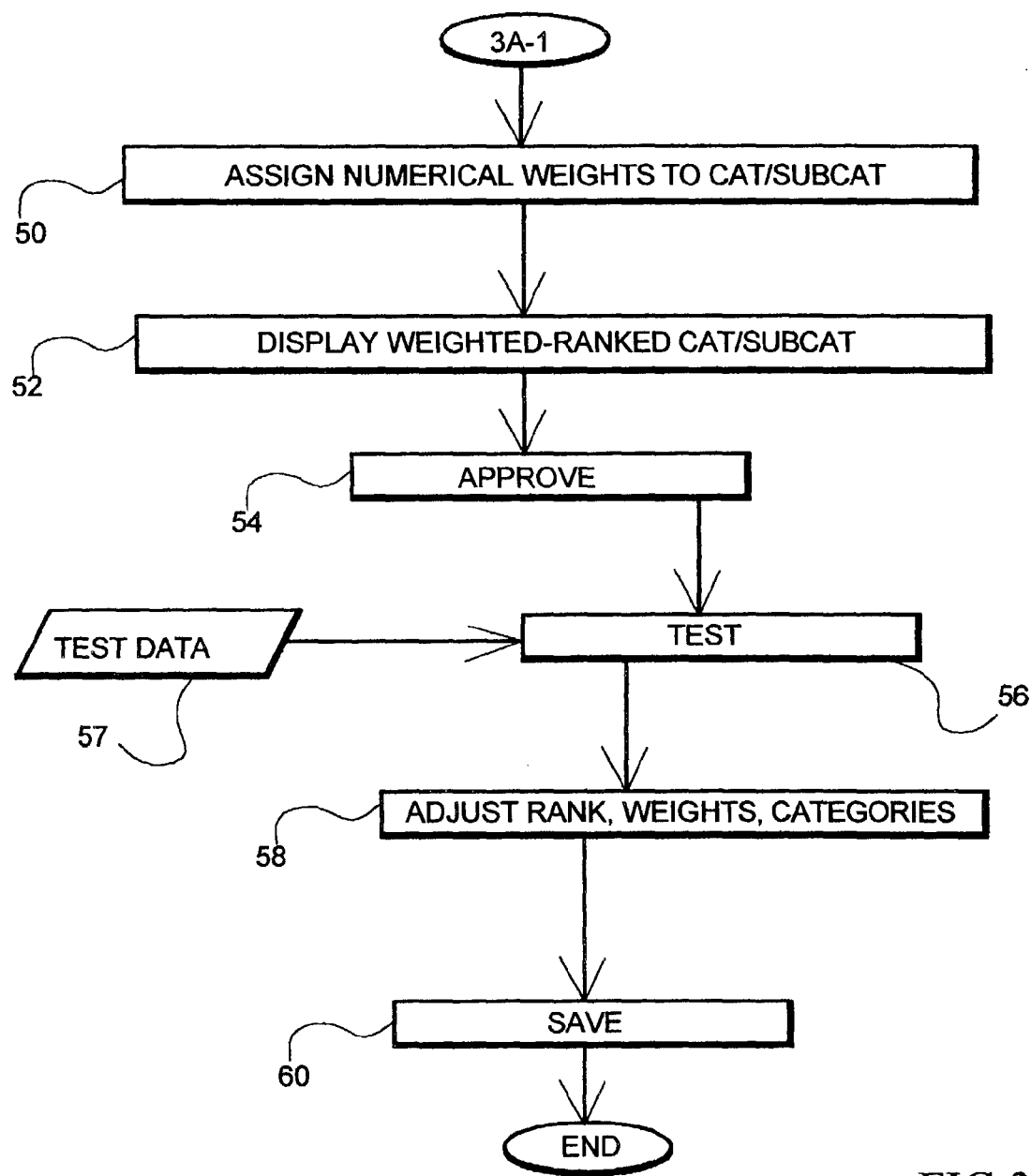

FIGS. 3A and 3B diagrammatically illustrate flow chart diagrams for one implementation of the initialize monitor function 10. The security sensitive words or critical words, etc. are optionally supplied as input 21 to function block 22 which identifies categories of the critical data. Sometimes herein the term "critical data" is utilized to refer to data elements or security sensitive words, data objects, characters or icons. As stated earlier, the user or the system administrator may select categories of critical data or, alternatively, may be supplied with certain critical words that are the subject of the risk analysis. In any event, categories are established for the critical words in step function 22 and, in step 24, subcategories for each category are developed. Step 26 accepts pre-existing data input 23 and gathers compilations of pre-existing data for each category and subcategory.

In step 28, the system operator ranks these categories and subcategories (steps 28, 30) in some orderly fashion in order to quantify the risk associated with the release of data which falls within or is subsumed by each category/subcategory. Step 32 recognizes that it may be beneficial to engage in a semantic check for all categories and subcategories searching for synonyms, antonyms and utilizing a thesaurus and dictionary to expand the list of categories. Decision step 34 inquires whether to add the semantic equivalents to the category list. If YES, function block 35 notes that the system now operates on new categories and subcategories and system jumps to a point immediately proceeding gather pre-existing data step 26. If NO, the system executes save function 36 which creates a critical data template. There are many data processing systems which may be employed in the risk monitor. Although the term "template" is used herein, any type of compilation of data, listing the critical or security sensitive words, etc. by category and subcategory, may be employed by the present invention. Hence, the term "data template" is meant to encompass the systems (files, databases, spreadsheets, filters) which contain the critical data or security sensitive words, etc. Any type of computer routine or system which gathers and stores data and maintains a rank quantifier for quantifying risk for the release of the critical data or data similar thereto may be employed in the risk monitor. The term "template" is meant to encompass these types of systems and subroutines.

Step 38 obtains pre-existing data for all categories and subcategories and step 40 compiles semantic equivalents for each word in each category and subcategory. This is different than the semantic check function 32 which operates primarily on the category itself. Step 40 compiles semantic equivalents and operates on the pre-existing data in the subcategory. Step 42 assigns a rank or a risk factor to each category based upon semantic equivalence step 40. Step 44 adds the semantic equivalents for the pre-existing data to the data template. Step 46 displays the ranked categories and subcategories to the system operator. Step 48 enables the system administrator to confirm that the categories are ranked by levels of security risk. This may be top secret (TS), secret(S), confidential (C), or non-confidential or not critical (NC). The system jumps at jump point 3A-1 from FIG. 3A to FIG. 3B.

Step 50 assigns a numerical weight or ranking to each category and subcategory. It is important to note that although numerical weights are discussed in conjunction with step 50, other types of quantifiers, quantifying the risk of data release, may be utilized. Step 52 displays the weighted and ranked categories and subcategories. Step 54 permits the system operator to approve the system. Step 56 tests the data template which represents categories and subcategories of pre-existing data. An input of test data 57 may be employed for test function 56. Step 58 permits the system operator to adjust the ranking, the weights and the categories and the subcategories. Save step 60 saves the pre-existing data template and all the categories and the subsumed data in those categories. The categories may be ranked sequentially and equally weighted or may be weighted differently such at categories 1-3 have a weight of "3" each, categories 4-6 are weighted "2" each and categories 7-10 are weighted "1" each.

Figure 4:
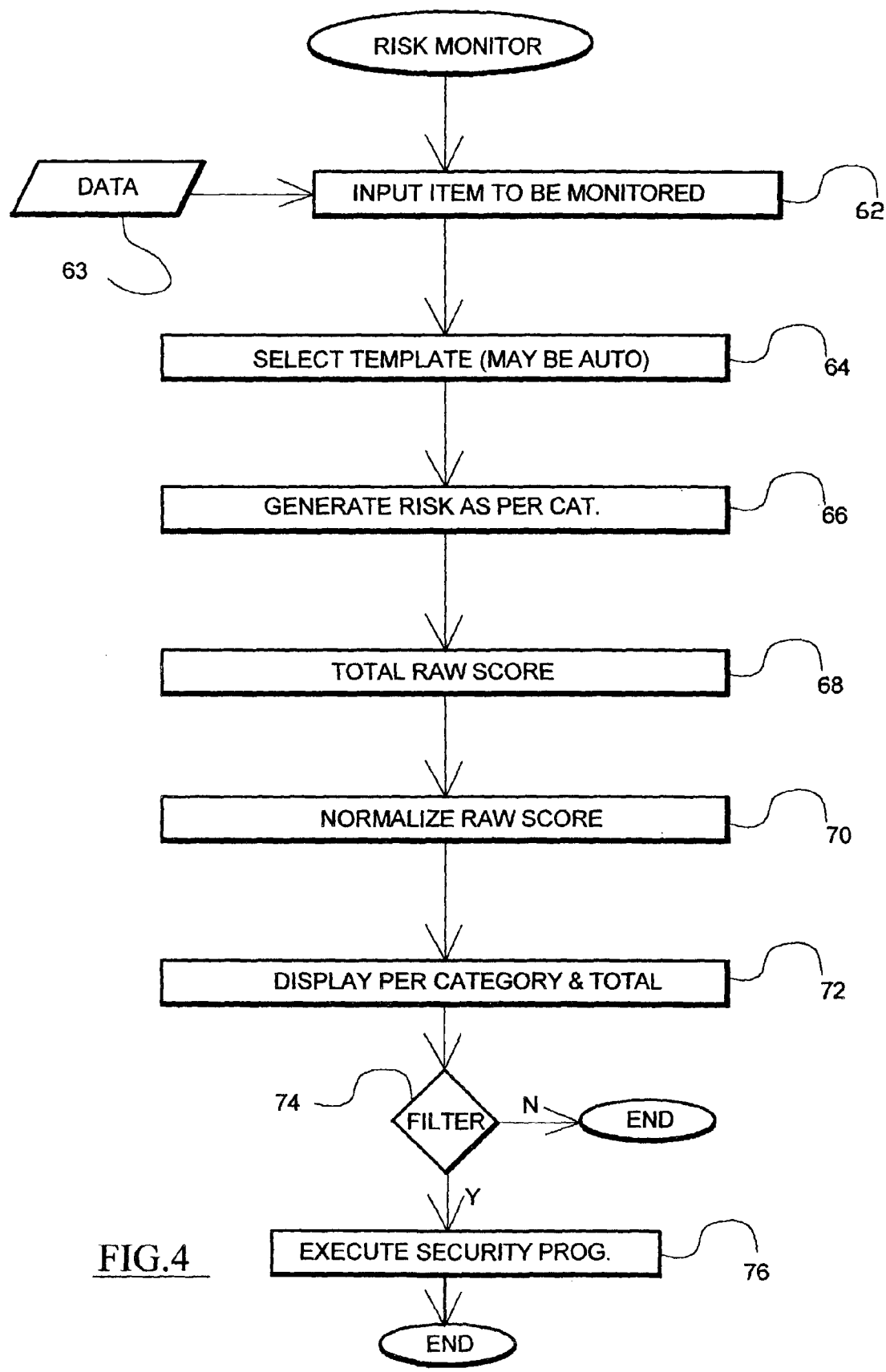
FIG. 4 diagrammatically illustrates a flow chart diagram for a simple risk monitor.

FIG. 4 diagrammatically illustrates risk monitor. Step 62 accepts the target data at input function 63. Step 64 recognizes that the user may select a pre-existing data template represented by categories and subcategories. Otherwise the system may be automatic. In a healthcare embodiment, automatic selection of the template may be conditioned upon the user inputting certain information establishing his or her right to see or obtain certain data. For example, the general practitioner for a particular patient should be entitled to view all of the health records of the patient. In contrast thereto, a radiologist studying the patient's records need not have access to certain health records of the patient, such as pharmacy records indicating prescription drugs taken by the patient. In this sense, the radiologist, after identifying himself or herself to the risk monitor, would cause the risk monitor to select only pertinent data of the patient regarding name, address and phone number, general condition and name of general practitioner. Hence, the automatic selective template would include a list of all excludable specialty items and keywords associated with those excluded specialties.

Step 66 recognizes that the risk monitor generates a risk assessment per category and step 68 combines a raw score from the rank quantities. The assessment compares the target data to the data template represented by the compiled pre-existing data. Scores are compiled based upon comparative hits between the target data and the data template. In some sense, the template is a data filter. Step 70 normalizes that raw score as necessary and step 72 displays the risk per category and the total risk. Alternatively, only a total single risk factor may be displayed in step 72 to the user. Decision step 74 recognizes that the user may filter the target data 63. The filter extracts data comparable to pre-existing data from the target data. If not, the system takes the NO branch and the program ends. If YES, the system executes a security program in step 76. The security program may involve simply stripping data from the target data 63, encrypting the security sensitive words, etc. found in the target data or may employ more sophisticated granular extraction and distribution throughout a store data network as disclosed in the following patents, which disclosures are incorporated herein by reference thereto: patent application Ser. No. 10/277,196 filed on Oct. 21, 2002 and patent application Ser. No. 10/115,192 filed on May 23, 2002 and Ser. No. 10/155,525 filed on May 23, 2002, patent application Ser. No. 10/008,209 filed on Dec. 6, 2001 and Ser. No. 10/008,218 filed on Dec. 6, 2001, and patent application Ser. No. 09/916,397 filed Jul. 27, 2001.

The basic theory behind the present invention is identifying categories and subcategories which describe security sensitive words, etc. or critical data, creating a compilation of pre-existing data, comparing the compiled pre-existing data to the target data and quantifying the risk based upon the comparison. Table 1 which follows provides categorical identifiers for personal identity. These categories, which may be utilized to identify a person, are not meant to be all encompassing but are mainly provided as examples.

TABLE 1

| Categorical Identifiers For Personal Identity | |
|---|---|
| name | birthplace |
| address(es) and variants | heritage |
| telephone number(s) and variants | health history |
| username | political party |
| biometrics | political beliefs |
| gene typing | association(s) |
| photograph | frequent flyer/buyer club info |
| date of birth | remittance advice |
| age | investigation evidence |
| marital status | court evidence |
| gender | EDI/EDIFACT records |
| sexual orientation | applications |
| sexual proclivities | personal web sites |
| disabilities | Chain of trust forms |
| tattoos | Chain of custody forms |
| scars | skill set |
| visible or functional injuries | religion |
| age/age range | personal interests |
| hair color | travel log |
| eye color | number of siblings |
| race profile | business partners |
| educational history | business name |
| employment history | profession |
| home price | account numbers (banking, services, suppliers) |
| ethnicity | service providers (physicians, insurers, hospitals, clinics, etc.) |
| personal interests | |
| personal descriptive information (e.g., SWHM 38, Professional) | X-rays |
| physical stigmata | surveillance |
| skill set | dental charts |
| credit history | medical records |
| credit reports (formal NCR, etc.) | account balances |
| social security number | account transfer or transaction amounts |
| patient ID or other location- or process-specific user assignment | income range |
| | neighborhood/city/region/country |
| insurance number | license (driver, occupational, professional) |
| credit card numbers | vehicle registration (license, tag, plate, etc.) |
| vehicle make, type, model, color, year | vehicle identification |
| date of life events | tax records (chattel, land, local, state, Federal, and special use taxes) |
| incident reports (legal, criminal, health services, news) | property ownership |
| | permit applications |
| accident reports (auto, OSHA, EPA, EEOC, etc.) | donor lists |
| | news reports |
| criminal convictions | family history |
| court records | family relationships |
| abuse records | family health history |
| divorce proceedings | legal documents |
| bankruptcy records | consent forms |
| organization registrations | newsgroup postings |
| Corporation officers and registrations | |

After categories are identified for the critical data, the system utilizes pre-existing data to build a data template against which the target data is tested.

Table 2 which follows provides some external sources of pre-existing data which may be used to identify a person.

TABLE 2

Sources of External Data (Databases)

| | |
|---|---|
| birth records | credit databases |
| vaccination programs | genealogical professional associations |
| school registration | bank account records |
| school records | medical treatment records |
| voter registration | medical history |
| marriage records | subscription databases |
| public commercial databases | releases under the Freedom of Information Act |
| property tax rolls | Surveillance, Epidemiology, and End-Results (SEER) |
| driver registration | |
| vehicle registration | American College of Surgeons |
| passport application and records | Centers for Disease Control |
| court records | US National Library of Medicine PubMed |
| police records | Human Genome Research Institute GenBank |
| court archives | Cancer Genome Anatomy Project |
| publication of legally-required posts | contest or sweepstake entries |
| news archives | product registrations |
| newsgroup archives | warrantee registrations |
| insurance company profiles | mailing list registrations |
| commercial profiles | neighborhood median age |
| vendor customer lists | |
| neighborhood median home prices | |
| neighborhood ethnic diversity | |

The third primary step in creating a risk monitor is to rank or quantify the categories of security sensitive words, etc. Table 3 which follows is a general attempt to quantify the categories for personal identification from a high risk value beginning with "name" to a low risk value ending with "personal interests". Again, the Ranked Identity Category Table 3 is not meant to be limiting but is meant to be an example. Individuals skilled in identifying a person may alter the ranking of the identity categories in Table 3.

TABLE 3

Ranked Identity Category

| | |
|---|---|
| name | disabilities |
| address | tattoos |
| telephone | scars |
| username | injuries |
| biometrics | age range |
| gene typing | hair color |
| photograph | eye color |
| date of birth | race profile |
| age | education |
| marital status | employment |
| sex | personal interests |
| sexual orientation | |
| sexual proclivities | |

The following Identity-Privacy Matrix is a graphic attempt to rank the identity categories in Table 3 and show that at point A, the identity of the person is well established (assuming the observer has most or all of items 2-24 including item 1, name of the person subject to the identity check) and extending to point B where it is virtually impossible to identify the person subject to the identity inquiry. Another conceptual analysis involves a percentage of population or statistical analysis based upon a demographic group. Beginning with date of birth and extending to personal interests, the system administrator may be able to assign certain percentages of population that have the same date of birth, that have the same age, that have the same disabilities (category 14), that have the same hair color (category 19), etc. Hence, at point B, the identity of the person is not known and yet at point A, the identity of the person is certainly known. Of course, the information in the target data supplied at input step 63 (FIG. 4, risk monitor), may include information at any range within the Identity Matrix 1-24. Further, some information may be available such as injury data 17, whereas other information such as sexual proclivities category 13 may not be available. Hence, the two-dimensional presentation of the Identity-Privacy Matrix below is only illustrative in nature.

Identity - Privacy Matrix

| Pt. A | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1. name | X | | | | | | | | | | | | | | | | | | | | | | | |
| 2. address | | X | | | | | | | | | | | | | | | | | | | | | | |
| 3. telephone | | | X | | | | | | | | | | | | | | | | | | | | | |
| 4. username | | | | X | | | | | | | | | | | | | | | | | | | | |
| 5. biometrics | | | | | X | | | | | | | | | | | | | | | | | | | |
| 6. gene typing | | | | | | X | | | | | | | | | | | | | | | | | | |
| 7. photograph | | | | | | | X | | | | | | | | | | | | | | | | | |
| 8. date of birth | | | | | | | | % | | | | | | | | | | | | | | | | |
| 9. age | | | | | | | | | % | | | | | | | | | | | | | | | |
| 10. marital status | | | | | | | | | | % | | | | | | | | | | | | | | |
| 11. sex | | | | | | | | | | | % | | | | | | | | | | | | | |
| 12. sexual orientation | | | | | | | | | | | | % | | | | | | | | | | | | |
| 13. sexual proclivities | | | | | | | | | | | | | % | | | | | | | | | | | |
| 14. disabilities | | | | | | | | | | | | | | % | | | | | | | | | | |
| 15. tattoos | | | | | | | | | | | | | | | % | | | | | | | | | |
| 16. scars | | | | | | | | | | | | | | | | % | | | | | | | | |
| 17. injuries | | | | | | | | | | | | | | | | | % | | | | | | | |
| 18. age range | | | | | | | | | | | | | | | | | | % | | | | | | |
| 19. hair color | | | | | | | | | | | | | | | | | | | % | | | | | |
| 20. eye color | | | | | | | | | | | | | | | | | | | | % | | | | |
| 21. race profile | | | | | | | | | | | | | | | | | | | | | % | | | |

-continued

Identity - Privacy Matrix

| Pt. A | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
|---|---|---|---|---|---|---|---|---|---|---|---|---|---|---|---|---|---|---|---|---|---|---|---|---|---|
| 22. education | | | | | | | | | | | | | | | | | | | | | | % | | | |
| 23. employment | | | | | | | | | | | | | | | | | | | | | | | % | | |
| 24. personal interests | | | | | | | | | | | | | | | | | | | | | | | | % | B |

The following tables provide some guidance regarding the type of pre-existing data gathered in input step 23 in the initialize monitor routine in FIG. 3A. Name Identifier Table 4 outlines how the system administrator could obtain a pre-existing data compilation of names from telephone directories. Initially, the entire telephone directory is obtained. The family names are stripped from the telephone directories and assigned a high rank within the name category. The given names are stripped from the telephone directories and ranked low. When there is a concurrence or similarity between the family name and the given name, the given names are modified to exclude similar family names. In other words, family names are ranked higher than the given names since family names are a better source of identification than the given name of a person.

TABLE 4

Name Identifier telephone directories (complied)

| | |
|---|---|
| Family Name (stripped from telephone directories) | Rank high |
| Given Name (stripped from directories) | Rank low |
| Concurrence Family Name and Given Name, revise Given Name to exclude concurring Family Names | Rank high |

Address Identifier Table 5, Educational Identifier Table 6 and Employment Identifier Table 7 also show examples of how the system operator can obtain pre-existing data for those categories. In the address identifier, telephone directories are again used and street names are stripped from cities, states and zip codes. An exemplary ranking from high, medium-low, low and medium-high is assigned to these subcategories for the "address" category.

TABLE 5

Address Identifier

Identify address format, e.g., house no., street name, city, state, zip code

| | |
|---|---|
| telephone directories, strip to identify street names | Rank high |
| city (strip database) | Rank medium-low |
| state (strip database) | Rank low |
| zip code (match street address with postal zones) (i.e., 6 digits, 10 digits, alpha-numeric (e.g. Canada)) | Rank medium-high |

TABLE 6

Educational Identifier

| | |
|---|---|
| directory of all colleges, universities and technical schools high schools | Rank high |
| use telephone directory, exclude all but words proximal to "high" or "school" | Rank low |

TABLE 7

Employment Identifier directory of companies (Dunn and Bradstreet, electronic business telephone book directory, corporate names from the 50 states)

The Educational Identifier Table uses directories of high schools and shows how a telephone directory can be used with a contextual rule to locate all high school names proximate to the word "high" or to the word "school." In other words, a rule that selects three words prior to all "high" words does extract this pre-existing data. The Employment Identifier Table simply utilizes an electronic database from Dun & Bradstreet or other electronic compilation. Further, corporate names obtained from the Secretaries of State for each of the 50 states could be used to compile the Employment Identifier Table pre-existing data.

The present invention can be employed equally to identify security sensitive words or critical words, phrases, icons or images for a business. Table 8 set forth below provides examples of categorical identifiers for a manufacturing business. Again, this list is not meant to be exhaustive or complete, but is only provided as an example of the types of categories and subcategories which a manufacturing business would employ in order to establish the risk monitor of the present invention.

TABLE 8

Categorical Identifiers for Manufacturing Business

Manufacturing product brand names
    product generic name
    drawings
    tools (brand names and generic names)
        hand tools
        software
        machines
    software, computer programs, etc.
    Research and Development
        competitors products, competitor names, patent numbers, patent titles, project names, project personnel Sales personnel
    competitors
    sales data
        quantity
        geographic distribution
    customers
        names, addresses, contacts
    sales projections TABLE 8-continued Categorical Identifiers for Manufacturing Business Financial chart of accounts
    ledgers
    financial statements
    tax returns Human Resources see categorical identifiers for personal identity As an example, a manufacturing business may employ a risk monitor to assess the risk of data release for all electronic documents, e-mails or other items that are released from its manufacturing operations. Although the security sensitive words, etc. may not be necessarily stripped from the document prior to release, a manager of the manufacturing division or manager of the sales division or the manager of the financial division or the manager of the human resources division may want to assess the risk of release of a particular document, database or data stream in order to determine whether the risk is acceptable. The sales manager may permit the release of sales data to its branch offices but may want to severely restrict and assess the risk of any personal information which may be inadvertently or deliberately released to those branch sales offices. Hence, the risk monitor provides a risk analysis per category as well as a total risk analysis for the entire document. Clearly, the financial category is more highly sensitive and there is no need for any person in manufacturing to have the financial documents in target data that may be released to the public, a competitor, or a consultant.

Figure 5:
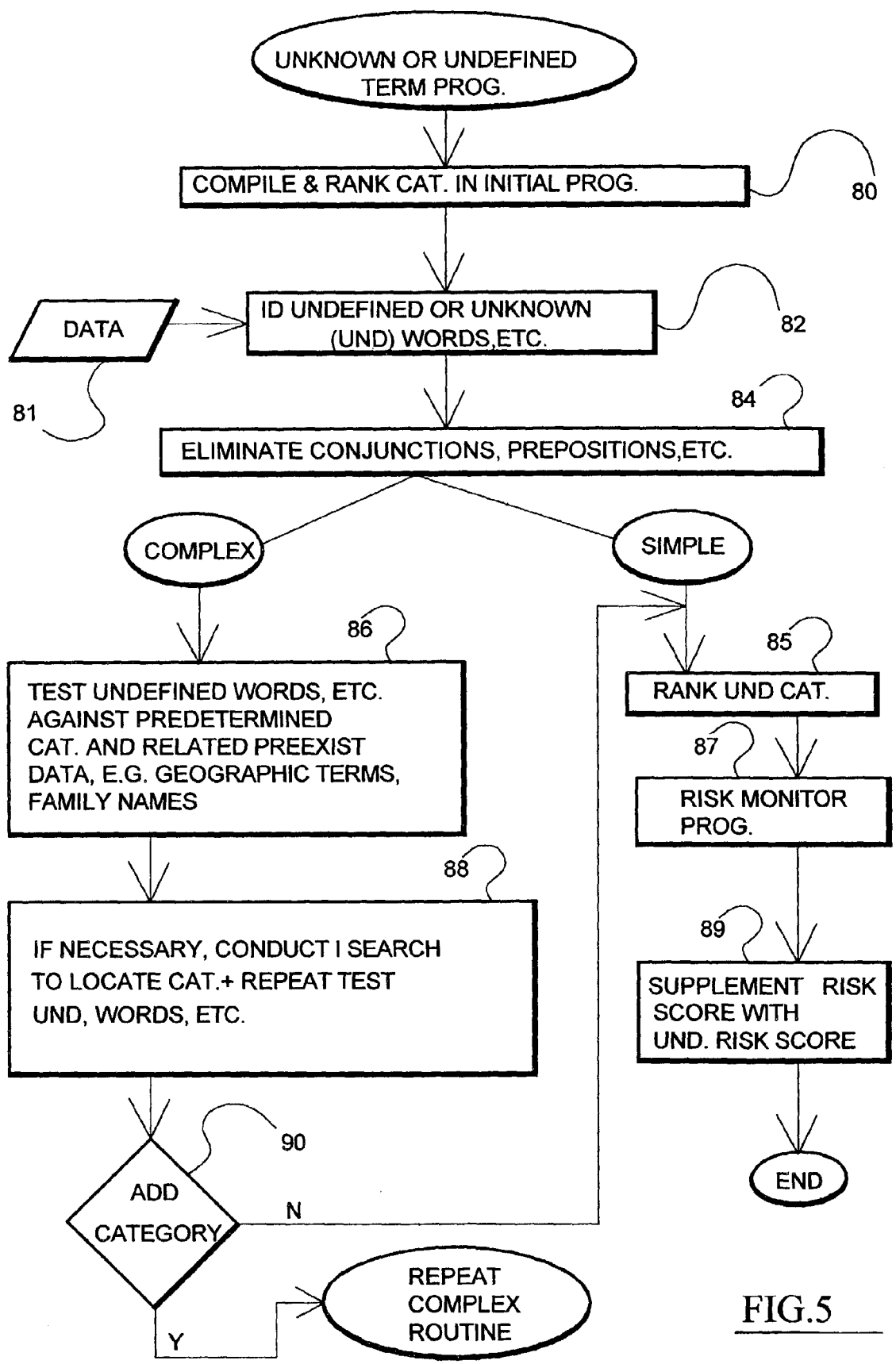
FIG. 5 diagrammatically illustrates the unknown or undefined term program in accordance with the principles of the present invention.

FIG. 5 diagrammatically illustrates the flow chart diagram for the unknown or undefined term program. Step 80 recognizes that the risk monitor has compiled and ranks categories and subcategories in the initial program. Target data is input at step 81 and step 82 identifies undefined or unknown words, terms, phrases, etc. in the target data. As a general statement, undefined or unknown UND words, data objects, characters or icons are any words, data objects, characters or icons which are not present in the pre-existing data in the plurality of ranked categories. Therefore, if a common dictionary was the only pre-existing data in a "general words" category, any specific family names, geographic terms, or technical terms may not be found by step 82. Those family names, geographic terms and technical terms would be classified as undefined UND words, etc. by step 82. Step 84 eliminates conjunctions, prepositions and other common forms of speech from the undefined UND words, etc. After step 84, the system could take a simple route or a complex route. The simple route in step 85 provides an undetermined or undefined category and permits the operator or system administrator to rank that undetermined category. Step 87 engages the risk monitor program and executes the program on the target data input in step 81. Step 89 supplements the risk score with the undetermined UND risk score.

If the complex route is taken from eliminate conjunction step 84, the system in step 86 tests the undefined UND words, etc. against a predetermined category and related pre-existing data. For example, returning again to the common word dictionary, the pre-existing category may be geographic terms. Alternatively, the pre-existing category may be family names. Skipping step 88 for a moment, if the undetermined or undefined UND words, etc. are in the predetermined category, the system operator in step 90 determines whether he or she wants to add that predetermined category. If not, the system takes the NO branch and returns to the simple branch immediately preceding step 101 which ranks the undefined UND category.

Returning to step 88, the unknown term program in FIG. 5 may engage in an Internet search (I search) to locate a category for the undefined UND words. For example, the system may take a single undefined term, activate a common Internet search engine for that undefined word, obtain text documents from the list of search hits, compare those documents obtained by the search against the pre-existing data and categories in order to locate categories which fall within semantic and contextual rules of the UND word. The contextual rules are, for example, 20 words before and 20 words after the UND word and an analysis regarding those 41 words. If such an analysis reveals an additional category, the system operator in step 90 determines whether to add the category. If not, the system executes the rank UND category step 85. If YES, the system repeats the complex routine. Accordingly, a series of predetermined categories could be summarized in the unknown term program causing the system operator to determine whether he or she wants to add that new category to the risk monitor. When a new category is added, it must be ranked in relation to the other categories and the pre-existing data for that category must be obtained from various sources.

Figure 6A:
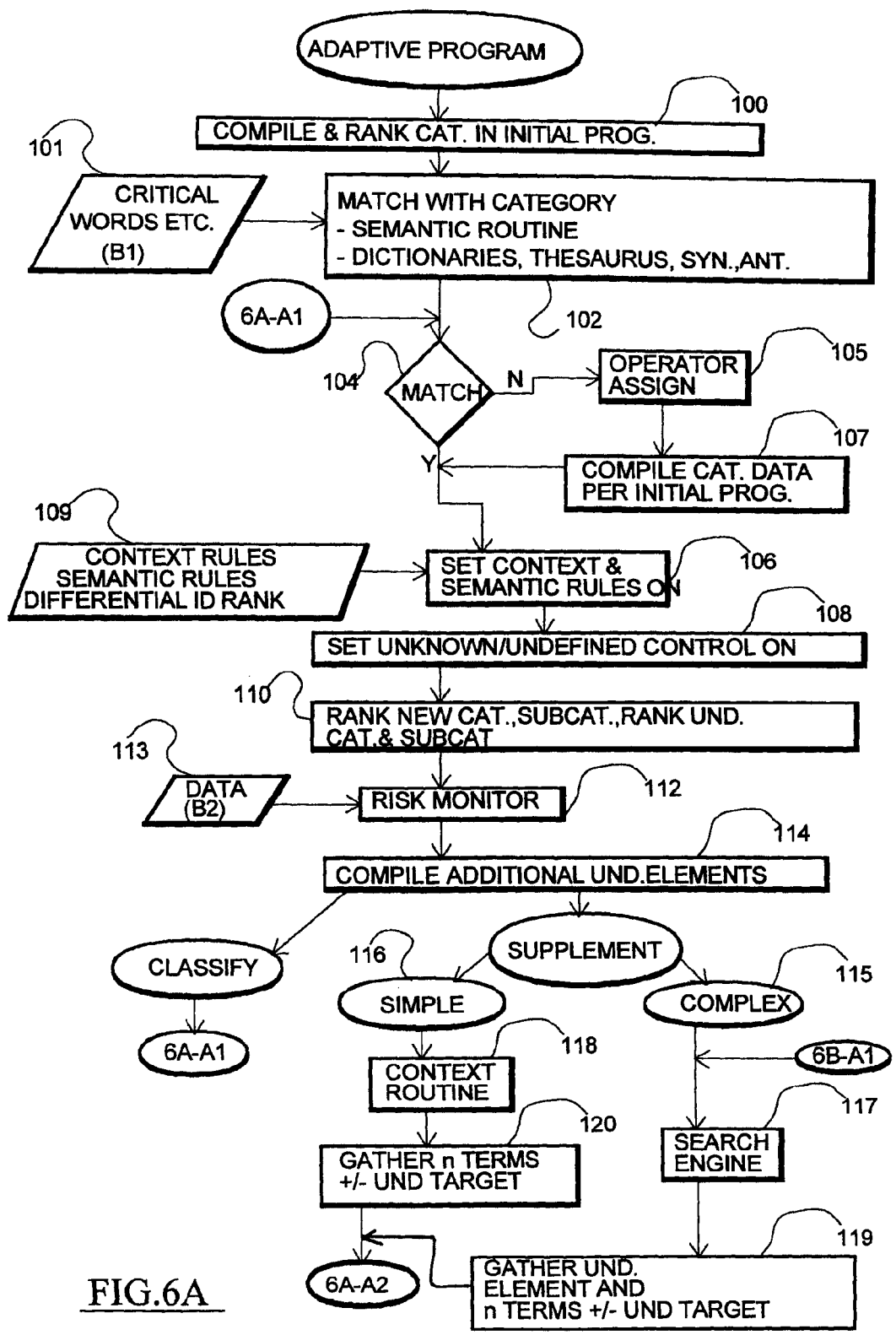
FIGS. 6A and 6B diagrammatically illustrate a flow chart diagram showing an adaptive program in accordance with the principles of present invention.
Figure 6B:
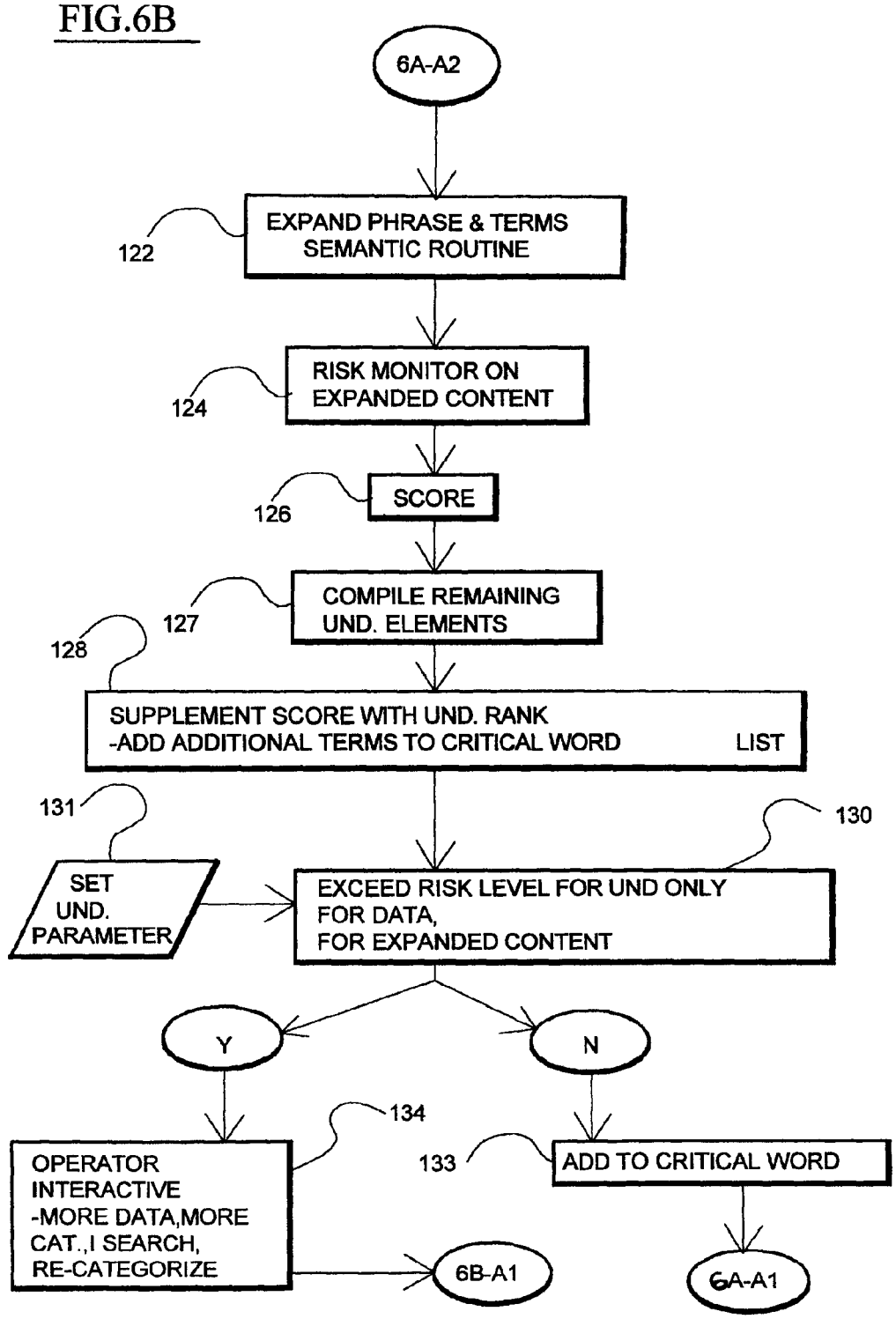

FIGS. 6A and 6B diagrammatically illustrate the adaptive program. Step 100 compiles and ranks the categories pursuant to the initial program. Step 102 accepts input from step 101 which represents the critical or security sensitive words, etc. Step 102 matches those critical words with a category by semantic routines, dictionaries, thesauruses, synonyms and antonyms. It is well known that critical words, in addition to having synonyms, may have similar critical words complementary to the original critical words in step 101 and the antonyms represent useful information equal to the original security sensitive words, etc. In step 104, a determination is made whether the critical word input 101 matches any of the categories of pre-existing data in step 102. If NO, the operator in step 105 is required to assign a category to those critical words. In step 107, the operator compiles pre-existing data for that category as required per the initial program and also ranks the category and the subsumed pre-existing data.

Returning to decision step 104, if a match is found between critical words input in step 101 to the categories in step 102, the YES branch is taken and the system sets ON the contextual and semantic rules in step 106. Input 109 recognizes that the system administrator may input contextual rules and semantic rules and differential identification rankings. Contextual rules prompt the system to select so much data before the subject data and so much data after the subject data. With respect to subject data which is text, as an example, the system may have a contextual rule to select three words prior to the term CIA and three words subsequent to the selected target word CIA. Of course, contextual rules may be based on character count, word count, spacing, paragraph count, commas or any other identifiable data characteristic. Contextual rules for icons would include locating target data such as New York City and indicating that any map showing New York City and Washington, D.C. would be placed on the medium-low security risk, confidential C level. Semantic rules are established by the system operator, such as the use of all synonyms for all critical words input in step 101, the use of antonyms, the use of ordinary dictionaries, technical dictionaries, medical dictionaries and the use of a thesaurus to expand the scope of the initially submitted critical words. Differential identification ranking implies that a higher risk score should be assigned critical data if the precise critical word or data is found in that target data. For example, if the critical words in step 101 are "aircraft carrier", and the target data tested by the risk monitor in input step 63 (FIG. 4) is a paragraph containing the words "aircraft carrier" and "vessel," that target data would be ranked with a higher risk factor than other target data only containing the semantic equivalent "vessel," that is, the semantic equivalent to the critical words "aircraft carrier". In other words, if the target data contains the exact critical words identified by the system operator, that target data should be assigned a higher risk value than other target data that does not have the identical critical words. This is a differential ranking for critical words as compared to semantically equivalent words. The differential identification ranking is ON as set by the operator or the user.

Step 108 sets the unknown and undefined control ON. Step 110 ranks the new categories and subcategories, ranks the undefined UND terms and categories and subcategories. Step 112 executes the risk monitor and target data is input in step 113. Step 114 compiles additional undefined elements not identified by the risk monitor. Those undefined elements or words, the UND words, are found in the target data input in step 113. The adaptive program then branches in either a classify routine or a supplement data routine. In the classify routine, the system jumps to jump point 6A-A1 which is immediately preceding the match decision step 104. If the supplement category branch is taken, the system again branches into simple and into complex. Complex branch 115 engages a search engine in step 117 similar to that described above in connection with step 86 in the unknown or undefined term program in FIG. 5. Step 119 gathers undefined or UND words or elements and a certain number of words or data elements "n" terms plus or minus the unknown UND target. The complex routine 115 then joins with the simple routine immediately step 120.

The simple supplement routine 116 executes a context routine 118 which generally encompasses steps 120, 122 and 124. In step 120, the system gathers n terms prior and subsequent to the undefined UND target word. The system jumps from jump point 6A-A2 to the same jump point in FIG. 6B. In step 122, the system expands that contextual phrase by substituting all semantic words for each word in the phrase. In step 124, the risk monitor is called upon to analyze the expanded content of that phrase. Step 126 scores the expanded content of that contextual phrase. Step 127 compiles any remaining undefined elements from that expanded content phrase. Step 128 supplements the risk score with the undefined UND ranking for each undetermined category and adds additional terms to the critical list. Those additional terms represent the expanded content taken from the context of the phrase on either side of the UND target element. Step 130 accepts an input from step 131 wherein the user sets the undetermined parameter. Step 130 determines whether the risk level is acceptable or unacceptable for the undefined UND terms only, whether the risk level is acceptable for the entire target data or whether the risk level is acceptable for the expanded content compiled above in steps 120, 122 and 124. If NO, the system executes step 133 which adds the expanded content to the critical word list. If YES, the operator is called upon in step 134 to determine whether to seek more preexisting data, add more categories, conduct an Internet search, and re-categorize and re-rank the entire risk monitor system. If an Internet search is necessary, the system jumps via jump point 6B-A1 to a point immediately preceding search engine 117 in the supplement-complex routine 115.

The adaptive program is entered by the operator either by the input of critical words at input step B1 (step 101) or the input target data step 113 which is input B2.

Figure 7:
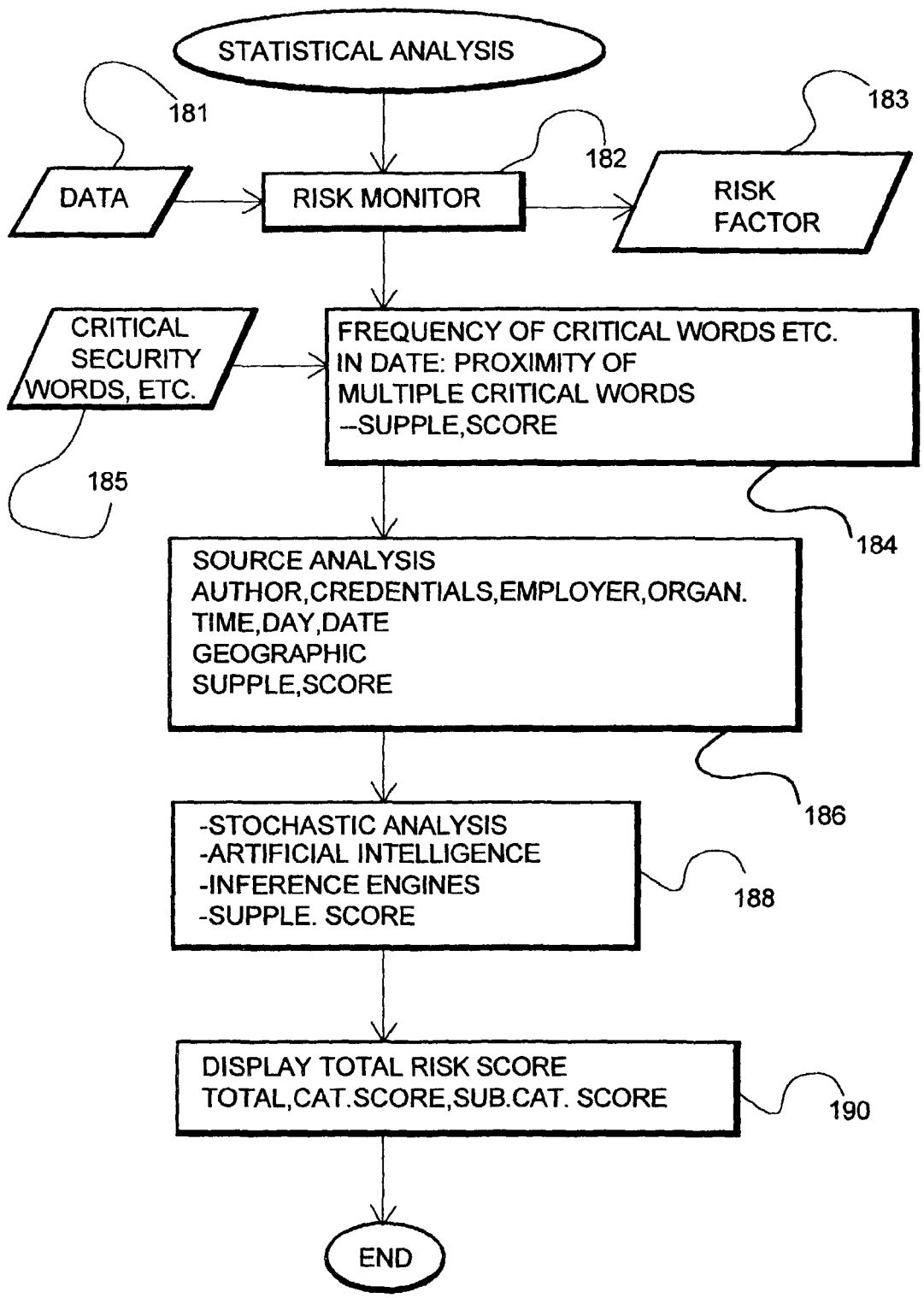
FIG. 7 diagrammatically illustrates a flow chart diagram for a statistical and stochastic analysis.

FIG. 7 shows statistical analysis routine for the risk monitor. Target data is input in step 181 and functional step 182 executes the risk monitor. A risk factor is output in output step 183. In step 184, the system determines the frequency of critical words, input in input step 185, in the target data. Further, statistical analysis such as the proximity of multiple critical words is accomplished by step 184. Many other statistical analyses regarding the critical words can be included in the statistical analysis step 184. Also, the risk factor is supplemented in step 184 to reflect a higher risk of security violation based upon the number of the critical words in the document. As an example, the frequent occurrence of the term "president" in a target document generally indicates a higher level of security risk than a document that only uses "president" once.

Step 186 analyzes the source of the target data, its author, the author's credentials, the author's employer or organization, the day, time and date, the geographic origination of the target data and respectively alters the risk score. As an example, data originating from northern Virginia (the headquarters of the Central Intelligence Agency) has a higher degree of risk than data generated from a source in Orlando, Fla. Step 188 engages in stochastic analysis of the target data and utilizes artificial intelligence, inference engines and supplements the risk score. Artificial intelligence and inference engines can be utilized to established enhanced contextual routines. Neural networks may also be utilized. Stochastic analysis is a random or probability analysis of the target data. Step 190 displays the total risk score for the target document and the risk score for each category and subcategory.

Figure 8:
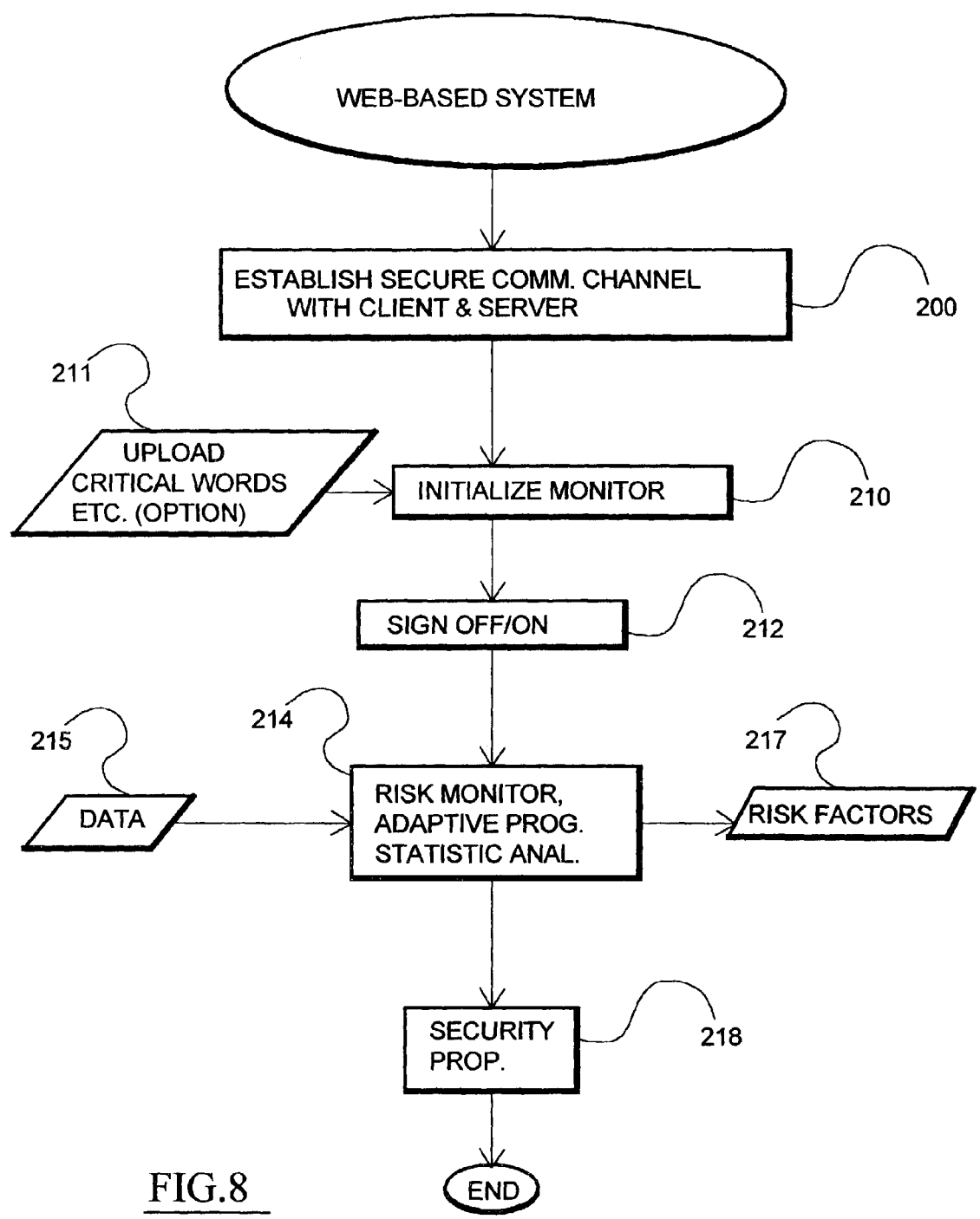
FIG. 8 diagrammatically illustrates the web based system operation in accordance with the principles of the present invention.

FIG. 8 diagrammatically illustrates a web based system utilizing the risk monitor. In the web based system, it is assumed that the monitor has been initialized by the system operator. Step 200 first establishes a secure communications channel between the client computer and the server. If the server is active on the Internet, this may include an SSL communications channel or other encrypted communications protocol. Step 210 initializes the monitor and permits the operator to upload critical words in input step 211. Step 212 recognizes that the operator may sign off after initializing the risk monitor. Step 214 executes the risk monitor, the adaptive program and any other program discussed herein. Target data is input in data input step 215. Risk factors are output in output step 217. Step 218 enables the operator to engage in a security program for the target data. Any type of security program may be utilized.

The claims appended hereto are meant to cover modifications and changes within the scope it of the present invention.

What is claimed is:

1. A computerized method, operating on target data, of quantifying the risk of releasing security sensitive content in target data processed by a computer system, said security sensitive words consisting essentially of content understood by humans identifying personal names, addresses, geographic terms, conceptual words and abbreviations derived from original security sensitive words, words in dictionaries and lists, personal identifying information, names associated with business entities, societal groups or associations related to heritage, demographics, religion, race, ethnicity, or political beliefs, comprising:

categorizing each one of said sensitive content words into one of a plurality of categories which includes the use of a semantic check for synonyms and antonyms with a thesaurus and a dictionary for categorizing each one of said sensitive content words into one of a plurality of categories;

obtaining and compiling preexisting data for each category;

ranking said categories by risk and assigning a risk rank quantifier to each respective category and preexisting data subsumed therein;

comparing said target data to said preexisting data and generating a security risk score output representative of all rank quantifiers associated with preexisting data found in said target data to quantify the risk of releasing security sensitive content; and processing said target data through a security program based upon said security risk score prior to release of said sensitive content, the security program including at least one of extracting word data, encrypting word data or extracting and securely distributing word data in said computer system; and establishing an indeterminable category for unknown or undefined words which are not present in said preexisting data in the plurality of ranked categories;

ranking and assigning a respective risk rank quantifier to said indeterminable category;

modifying said risk score output with rank quantifiers representing said indeterminable words in said target data.

2. The method as claimed in claim 1 wherein the step of comparing said target data to said preexisting data compilation occurs after establishing said indeterminable category for unknown or undefined words.

3. The method as claimed in claim 2 wherein the step of ranking includes ranking said security sensitive words.

4. The method as claimed in claim 3 wherein ranking said security sensitive words occurs concurrently or prior to ranking said categories.

5. The method as claimed in claim 4 wherein said security sensitive words are subsumed in respective ones of said plurality of categories.

6. The method as claimed in claim 5 wherein the step of categorizing said security sensitive words includes matching said security sensitive words, data objects, characters, images, data elements or icons with a predetermined plurality of preexisting categories.

7. The method as claimed in claim 6 wherein each preexisting category of said predetermined plurality of preexisting categories has associated therewith preexisting data and the step of matching correlates said security sensitive words with said preexisting data in said predetermined plurality of preexisting categories.

8. The method as claimed in claim 7 including inferring additional security sensitive words from said respective ones of said plurality of categories.

9. The method as claimed in claim 8 wherein the step of inferring utilizes contextual and semantic rules to identify said additional security sensitive words.

10. The method as claimed in claim 9 including the step of searching one or more data sources from the group of data sources including the Internet, an intranet and an extranet, the step of searching used to infer said additional security sensitive words.

11. The method as claimed in claim 10 including assigning a differential risk rank quantifier to said security sensitive words which is different than said risk rank quantifier assigned to the subsumed category.

12. The method as claimed in claim 11 including: analyzing the presence of said security sensitive words in said target data, said analysis including a frequency analysis in said and a stochastic analysis in said target data; and altering said risk score output based upon said analysis.

13. The method as claimed in claim 1 including aggregating risk rank quantifiers representing said indeterminable words in said target data with said risk rank quantifiers associated with preexisting data found in said target data.

14. The method as claimed in claim 1 wherein the step of ranking includes ranking said security sensitive words.

15. The method as claimed in claim 14 wherein ranking said security sensitive words occurs concurrently or prior to ranking said categories.

16. The method as claimed in claim 1 wherein said security sensitive words are subsumed in respective ones of said plurality of categories.

17. The method as claimed in claim 1 wherein the step of categorizing said security sensitive words includes matching said security sensitive words with a predetermined plurality of preexisting categories.

18. The method as claimed in claim 17 wherein each preexisting category of said predetermined plurality of preexisting categories has associated therewith preexisting data and the step of matching correlates said security sensitive words with said preexisting data in said predetermined plurality of preexisting categories.

19. The method as claimed in claim 1 wherein said security sensitive words are subsumed in respective ones of said plurality of categories and the method includes inferring additional security sensitive words from said respective ones of said plurality of categories.

20. The method as claimed in claim 19 wherein the step of inferring utilizes contextual and semantic rules to identify said additional security sensitive words.

21. The method as claimed in claim 20 including the step of searching one or more data sources from the group of data sources including the Internet, an intranet and an extranet, the step of searching used to infer said additional security sensitive words.

22. The method as claimed in claim 1 wherein said security sensitive words are subsumed in respective ones of said plurality of categories, the method including assigning a differential risk rank quantifier to said security sensitive words which are different than said risk rank quantifier assigned to the subsumed category.

23. The Method as claimed in claim 1 wherein said security sensitive words are subsumed in respective ones of said plurality of categories, the method including: analyzing the presence of said security sensitive words in said target data, said analysis including a frequency analysis and a stochastic analysis in said target data; and altering said risk score output based upon said analysis.

24. The method as claimed in claim 1 wherein the step of comparing said target data to said preexisting data compilation occurs after establishing said indeterminable category for unknown or undefined words.

25. The computerized method as claimed in claim 24 wherein the step of ranking includes risk ranking said security sensitive words.

26. The computerized method as claimed in claim 25 wherein ranking said security sensitive words occurs concurrently or prior to ranking said categories.

27. The computerized method as claimed in claim 26 wherein said security sensitive words are subsumed in respective ones of said plurality of categories.

28. The computerized method as claimed in claim 27 wherein the step of categorizing said security sensitive words includes matching said security sensitive words with a predetermined plurality of preexisting categories.

29. The computerized method as claimed in claim 28 wherein each preexisting category of said predetermined plurality of preexisting categories has associated therewith preexisting data and the step of matching correlates said security sensitive words with said preexisting data in said predetermined plurality of preexisting categories.

30. The computerized method as claimed in claim 29 including inferring additional security sensitive words from said respective ones of said plurality of categories.

31. The computerized method as claimed in claim 30 wherein the step of inferring utilizes contextual and semantic rules to identify said additional security sensitive words.

32. The computerized method as claimed in claim 31 including the step of searching one or more data sources from the group of data sources including the Internet, an intranet and an extranet, the step of searching used to infer said additional security sensitive words.

33. The computerized method as claimed in claim 32 including assigning a differential risk rank quantifier to said security sensitive words which is different than said risk rank quantifier assigned to the subsumed category.

34. The computerized method as claimed in claim 33 including: analyzing the presence of said security sensitive words in said target data, said analysis including a frequency analysis in said and a stochastic analysis in said target data; and altering said risk score output based upon said analysis.

35. The method as claimed in claim 1 including aggregating risk rank quantifiers representing said indeterminable words in said target data with said risk rank quantifiers associated with preexisting data found in said target data.

36. The method as claimed in claim 1 including aggregating risk rank quantifiers representing said indeterminable words in said target data with said risk rank quantifiers associated with preexisting data found in said target data.

37. A computerized method, operating on target data, of quantifying the risk of releasing security sensitive words, data objects, characters, images, data elements or icons in said target data processed by a computer system comprising:

38. The computerized method as claimed in claim 37 wherein the step of ranking includes risk ranking said security sensitive words.

39. The computerized method as claimed in claim 38 wherein ranking said security sensitive words occurs concurrently or prior to ranking said categories.

40. The computerized method as claimed in claim 37 wherein said security sensitive words are subsumed in respective ones of said plurality of categories.

41. The computerized method as claimed in claim 37 wherein the step of categorizing said security sensitive words includes matching said security sensitive words with a predetermined plurality of preexisting categories.

42. The computerized method as claimed in claim 41 wherein each preexisting category of said predetermined plurality of preexisting categories has associated therewith preexisting data and the step of matching correlates said security sensitive words with said preexisting data in said predetermined plurality of preexisting categories.

43. The computerized method as claimed in claim 37 wherein said security sensitive words are subsumed in respective ones of said plurality of categories and the method includes inferring additional security sensitive words from said respective ones of said plurality of categories.

44. The computerized method as claimed in claim 43 wherein the step of inferring utilizes contextual and semantic rules to identify said additional security sensitive words.

45. The computerized method as claimed in claim 44 including the step of searching one or more data sources from the group of data sources including the Internet, an intranet and an extranet, the step of searching used to infer said additional security sensitive words.

46. The computerized method as claimed in claim 37 wherein said security sensitive words are subsumed in respective ones of said plurality of categories, the method including assigning a differential risk rank quantifier to said security sensitive words which is different than said risk rank quantifier assigned to the subsumed category.

47. The computerized method as claimed in claim 37 wherein said security sensitive words are subsumed in respective ones of said plurality of categories, the method including:
analyzing the presence of said security sensitive words in said target data, said analysis including a frequency analysis in said and a stochastic analysis in said target data; and
altering said risk score output based upon said analysis.

48. A computerized method, operating on target data, of quantifying the risk of releasing security sensitive words, said security sensitive words consisting essentially of personal names, addresses, geographic terms, conceptual words and abbreviations derived from original security sensitive words, words in dictionaries and lists, personal identifying information, names associated with business entities, words which identify projects, tasks, tools, machines, systems and products and technical terms, societal groups or associations related to heritage, demographics, religion, race, ethnicity, or political beliefs, in said target data processed by a computer system, wherein each one of said security sensitive words is categorized into one of a plurality of categories, and wherein said plurality of categories include an indeterminable category for unknown or undefined words which are not present in said preexisting data in the plurality of categories, the method comprising:
obtaining and compiling preexisting data for each category;
ranking said categories by risk and assigning a risk rank quantifier to each respective category and to preexisting data subsumed therein;
comparing said target data to said preexisting data and generating risk score output representative of all rank quantifiers associated with preexisting data found in said target data to quantify the risk of releasing security sensitive word content; and
processing said target data through a security program based upon said security risk score prior to release of said sensitive word content, the security program including at least one of extracting word data, encrypting word data or extracting and securely distributing sensitive word data in said computer system; and
ranking and assigning a respective risk rank quantifier to said indeterminable category;
modifying said risk score output with rank quantifiers representing said indeterminable words in said target data.

49. The method as claimed in claim 48 wherein the step of ranking includes ranking said security sensitive words.

50. The method as claimed in claim 49 wherein ranking said security sensitive words occurs concurrently or prior to ranking said categories.

51. The method as claimed in claim 48 wherein said security sensitive words are subsumed in respective ones of said plurality of categories and the method includes inferring additional security sensitive words from said respective ones of said plurality of categories.

52. The method as claimed in claim 51 wherein the step of inferring utilizes contextual and semantic rules to identify said additional security sensitive words.

53. The method as claimed in claim 52 including the step of searching one or more data sources from the group of data sources including the Internet, an intranet and an extranet, the step of searching used to infer said additional security sensitive words.

54. The method as claimed in claim 48 wherein said security sensitive words are subsumed in respective ones of said plurality of categories, the method including assigning a differential risk rank quantifier to said security sensitive words, data objects, characters, images, data elements or icons which is different than said risk rank quantifier assigned to the subsumed category.

55. The method as claimed in claim 48 wherein said security sensitive words are subsumed in respective ones of said plurality of categories, the method including: analyzing the presence of said security sensitive words in said target data, said analysis including a frequency analysis in said and a stochastic analysis in said target data; and altering said risk score output based upon said analysis.

56. The method as claimed in claim 48 wherein the step of ranking includes ranking said security sensitive words.

57. The method as claimed in claim 56 wherein ranking said security sensitive words occurs concurrently or prior to ranking said categories.

58. The method as claimed in claim 57 wherein said security sensitive words are subsumed in respective ones of said plurality of categories and the method including inferring additional security sensitive words from said respective ones of said plurality of categories.

59. The method as claimed in claim 58 wherein the step of inferring utilizes contextual and semantic rules to identify said additional security sensitive words.

60. The method as claimed in claim 59 including the step of searching one or more data sources from the group of data sources including the Internet, an intranet and an extranet, the step of searching used to infer said additional security sensitive words.

61. The Method as claimed in claim 60 including assigning a differential risk rank quantifier to said security sensitive words which is different than said risk rank quantifier assigned to the subsumed category.

62. The method as claimed in claim 61 including:
analyzing the presence of said security sensitive words in said target data, said analysis including a frequency analysis in said and a stochastic analysis in said target data; and altering said risk score output based upon said analysis.

63. A computerized method, operating on target data, of quantifying the risk of releasing security sensitive words, said security sensitive words consisting essentially of personal names, addresses, geographic terms, conceptual words and abbreviations derived from original security sensitive words, words in dictionaries and lists, personal identifying information, names associated with business entities, words which identify projects, tasks, tools, machines, systems and products and technical terms, societal groups or associations related to heritage, demographics, religion, race, ethnicity, or political beliefs, in said target data in a computer system wherein each one of said security sensitive words is categorized into one of a plurality of categories, and wherein said plurality of categories include an indeterminable category for unknown or undefined words which are not present in said preexisting data in the plurality of categories, the method comprising:
obtaining and compiling preexisting data for each category;
ranking said categories by risk and assigning a risk rank quantifier to each respective category and to preexisting data subsumed therein;
comparing said target data to said preexisting data and generating risk score output representative of all rank quantifiers associated with preexisting data found in said target data to quantify the risk of releasing security sensitive word content; and
processing said target data through a security program based upon said security risk score prior to release of said sensitive word content, the security program including at least one of extracting word data, encrypting word data or extracting and securely distributing sensitive word data in said computer system; and
ranking and assigning a respective risk rank quantifier to said indeterminable category;
modifying said risk score output with rank quantifiers representing said indeterminable words in said target data.

64. The computerized method as claimed in claim 63 wherein the step of ranking includes ranking said security sensitive words.

65. The computerized method as claimed in claim 64 wherein ranking said security sensitive words occurs concurrently or prior to ranking said categories.

66. The computerized method as claimed in claim 63 wherein said security sensitive words are subsumed in respective ones of said plurality of categories and the method includes inferring additional security sensitive words from said respective ones of said plurality of categories.

67. The computerized method as claimed in claim 66 wherein the step of inferring utilizes contextual and semantic rules to identify said additional security sensitive words.

68. The computerized method as claimed in claim 67 including the step of searching one or more data sources from the group of data sources including the Internet, an intranet and an extranet, the step of searching used to infer said additional security sensitive words.

69. The computerized method as claimed in claim 63 wherein said security sensitive words are subsumed in respective ones of said plurality of categories, the method including assigning a differential risk rank quantifier to said security sensitive words which is different than said risk rank quantifier assigned to the subsumed category.

70. The computerized method as claimed in claim 63 wherein said security sensitive words are subsumed in respective ones of said plurality of categories, the method including:
analyzing the presence of said security sensitive words in said target data, said analysis including a frequency analysis and a stochastic analysis in said target data; and altering said risk score output based upon said analysis.

71. The computerized method as claimed in claim 63 wherein the step of ranking includes ranking said security sensitive words.

72. The computerized method as claimed in claim 71 wherein ranking said security sensitive words occurs concurrently or prior to ranking said categories.

73. The computerized method as claimed in claim 72 wherein said security sensitive words are subsumed in respective ones of said plurality of categories and the method including inferring additional security sensitive words from said respective ones of said plurality of categories.

74. The computerized method as claimed in claim 73 wherein the step of inferring utilizes contextual and semantic rules to identify said additional security sensitive words.

75. The computerized method as claimed in claim 74 including the step of searching one or more data sources from the group of data sources including the Internet, an intranet and an extranet, the step of searching used to infer said additional security sensitive words.

76. The computerized method as claimed in claim 75 including assigning a differential risk rank quantifier to said security sensitive words which is different than said risk rank quantifier assigned to the subsumed category.

77. The computerized method as claimed in claim 76 including: analyzing the presence of said security sensitive words in said target data, said analysis including a frequency analysis in said and a stochastic analysis in said target data; and altering said risk score output based upon said analysis.

78. A computerized method, operating on target data, of quantifying the risk of releasing security sensitive words, said security sensitive words consisting essentially of personal names, addresses, geographic terms, conceptual words and abbreviations derived from original security sensitive words, words in dictionaries and lists, personal identifying information, names associated with business entities, words which identify projects, tasks, tools, machines, systems and products and technical terms, societal groups or associations related to heritage, demographics, religion, race, ethnicity, or political beliefs, in said target data processed by a computer system deployed in a client-server computer system with at least one server computer operatively coupled to at least one client computer over a communications network comprising:
    categorizing each one of said security sensitive words into one of a plurality of categories on said at least one server computer;
    obtaining and compiling preexisting data for each category via said at least one server computer;
    ranking said categories by risk and assigning a risk rank quantifier to each respective category and preexisting data subsumed therein via said at least one server computer;
    comparing said target data to said preexisting data and generating risk score output representative of all rank quantifiers associated with preexisting data found in said target data to quantify the risk of releasing security sensitive word content in an exchange between said at least one server computer and said at least one client computer; and
    processing said target data through a security program based upon said security risk score prior to release of said sensitive word content, the security program including at least one of extracting word data, encrypting word data or extracting and securely distributing word data in said computer system; and
    establishing an indeterminable category for unknown or undefined words which are not present in said preexisting data in the plurality of ranked categories;
    ranking and assigning a respective risk rank quantifier to said indeterminable category;
    modifying said risk score output with rank quantifiers representing said indeterminable words in said target data.

79. The computerized method as claimed in claim 78 wherein the step of comparing said target data to said preexisting data compilation occurs after establishing said indeterminable category for unknown or undefined words.

80. The computerized method as claimed in claim 78 including aggregating rank quantifiers representing said indeterminable words in said target data with said rank quantifiers associated with preexisting data found in said target data via said at least one server computer.

81. The computerized method as claimed in claim 78 wherein the step of ranking includes ranking said security sensitive words.

82. The computerized method as claimed in claim 81 wherein ranking said security sensitive words occurs concurrently or prior to ranking said categories.

83. The computerized method as claimed in claim 78 wherein said security sensitive words are subsumed in respective ones of said plurality of categories.

84. The computerized method as claimed in claim 78 wherein the step of categorizing said security sensitive words includes matching said security sensitive words, data objects, characters, images, data elements or icons with a predetermined plurality of preexisting categories on said at least one server computer.

85. The computerized method as claimed in claim 84 wherein each preexisting category of said predetermined plurality of preexisting categories has associated therewith preexisting data and the step of matching correlates said security sensitive words with said preexisting data in said predetermined plurality of preexisting categories.

86. The computerized method as claimed in claim 78 wherein said security sensitive words are subsumed in respective ones of said plurality of categories and the method includes inferring additional security sensitive words from said respective ones of said plurality of categories on said at least one server computer.

87. The computerized method as claimed in claim 86 wherein the step of inferring utilizes contextual and semantic rules to identify said additional security sensitive words.

88. The computerized method as claimed in claim 87 including the step of searching one or more data sources from the group of data sources including the Internet, an intranet and an extranet via said at least one server computer, the step of searching used to infer said additional security sensitive words.

89. The computerized method as claimed in claim 78 wherein said security sensitive words are subsumed in respective ones of said plurality of categories, the method including assigning a differential risk rank quantifier to said security sensitive words which is different than said risk rank quantifier assigned to the subsumed category on said at least one server computer.

90. The computerized method as claimed in claim 78 wherein said security sensitive words are subsumed in respective ones of said plurality of categories, the method including: analyzing the presence of said security sensitive words in said target data, said analysis including a frequency analysis in said and a stochastic analysis in said target data via said at least one server computer; and altering said risk score output based upon said analysis in said exchange between said at least one server computer and said at least one client computer.

91. A server-based computerized method, operating on target data, of quantifying the risk of releasing security sensitive words, said security sensitive words consisting essentially of personal names, addresses, geographic terms, conceptual words and abbreviations derived from original security sensitive words, words in dictionaries and lists, personal identifying information, names associated with business entities, words which identify projects, tasks, tools, machines, systems and products and technical terms, societal groups or associations related to heritage, demographics, religion, race, ethnicity, or political beliefs, in said target data processed by a computer deployed in a client-server computer system with at least one server computer operatively coupled to at least one client computer over a communications network comprising:

categorizing each one of said security sensitive words into one of a plurality of categories on said at least one server computer;

obtaining and compiling preexisting data for each category via said at least one server computer;

ranking said categories by risk and assigning a risk rank quantifier to each respective category and preexisting data subsumed therein via said at least one server computer;

comparing said target data to said preexisting data and generating risk score output, directed at said at least one client computer, representative of all rank quantifiers associated with preexisting data found in said target data to quantify the risk of releasing security sensitive word content; and, processing said target data through a security program based upon said security risk score prior to release of said sensitive word content, the security program including at least one of extracting word data, encrypting word data or extracting and securely distributing word data in said computer system; and establishing an indeterminable category for unknown or undefined words which are not present in said preexisting data in the plurality of ranked categories;

ranking and assigning a respective risk rank quantifier to said indeterminable category;

modifying said risk score output with rank quantifiers representing said indeterminable words in said target data.

92. The server-based computerized method as claimed in claim 91 including: wherein ranking and assigning a respective risk rank quantifier to said indeterminable category utilizes said at least one server computer; and directing the modified risk score output to said at least one client computer.

93. The server-based computerized method as claimed in claim 92 wherein the step of comparing said target data to said preexisting data compilation occurs after establishing said indeterminable category for unknown or undefined words.

94. The server-based computerized method as claimed in claim 92 including aggregating rank quantifiers representing said indeterminable words in said target data with said rank quantifiers associated with preexisting data found in said target data via said at least one server computer.

95. The server-based computerized method as claimed in claim 91 wherein the step of ranking includes ranking said security sensitive words.

96. The server-based computerized method as claimed in claim 95 wherein ranking said security sensitive words occurs concurrently or prior to ranking said categories.

97. The server-based computerized method as claimed in claim 91 wherein said security sensitive words are subsumed in respective ones of said plurality of categories.

98. The server-based computerized method as claimed in claim 91 wherein the step of categorizing said security sensitive words includes matching said security sensitive words with a predetermined plurality of preexisting categories on said at least one server computer.

99. The server-based computerized method as claimed in claim 98 wherein each preexisting category of said predetermined plurality of preexisting categories has associated therewith preexisting data and the step of matching correlates said security sensitive words with said preexisting data in said predetermined plurality of preexisting categories.

100. The server-based computerized method as claimed in claim 91 wherein said security sensitive words are subsumed in respective ones of said plurality of categories and the method includes inferring additional security sensitive words from said respective ones of said plurality of categories on said at least one server computer.

101. The server-based computerized method as claimed in claim 100 wherein the step of inferring utilizes contextual and semantic rules to identify said additional security sensitive words.

102. The server-based computerized method as claimed in claim 101 including the step of searching one or more data sources from the group of data sources including the Internet, an intranet and an extranet via said at least one server computer, the step of searching used to infer said additional security sensitive words.

103. The server-based computerized method as claimed in claim 91 wherein said security sensitive words are subsumed in respective ones of said plurality of categories, the method including assigning a differential risk rank quantifier to said security sensitive words which is different than said risk rank quantifier assigned to the subsumed category on said at least one server computer.

104. The server-based computerized method as claimed in claim 91 wherein said security sensitive words are subsumed in respective ones of said plurality of categories, the method including: analyzing the presence of said security sensitive words in said target data, said analysis including a frequency analysis in said and a stochastic analysis in said target data via said at least one server computer; and altering said risk score output based upon said analysis and directing the altered risk score output to said at least one client computer.

105. A non-transitory computer readable storage medium having stored thereon and encoded with non-transitory programming instructions, operating on target data, for quantifying the risk of releasing security sensitive words, said security sensitive words consisting essentially of personal names, addresses, geographic terms, conceptual words and abbreviations derived from original security sensitive words, words in dictionaries and lists, personal identifying information, names associated with business entities, words which identify projects, tasks, tools, machines, systems and products and technical terms, societal groups or associations related to heritage, demographics, religion, race, ethnicity, or political beliefs, in said target data processed by a computer system, the programming instructions comprising:

categorizing each one of said security sensitive words into one of a plurality of categories;

obtaining and compiling preexisting data for each category;

ranking said categories by risk and assigning a risk rank quantifier to each respective category and preexisting data subsumed therein;

comparing said target data to said preexisting data and generating risk score output representative of all risk rank quantifiers associated with preexisting data found in said target data to quantify the risk of releasing security sensitive word content, and, processing said target data through a security program based upon said security risk score prior to release of said sensitive word content, the security program including at least one of extracting word data, encrypting word data or extracting and securely distributing word data in said computer system; and establishing an indeterminable category for unknown or undefined words which are not present in said preexisting data in the plurality of ranked categories;

ranking and assigning a respective risk rank quantifier to said indeterminable category;

modifying said risk score output with rank quantifiers representing said indeterminable words in said target data.

106. The non-transitory computer readable medium with programming instructions as claimed in claim 105 wherein the step of comparing said target data to said preexisting data compilation occurs after establishing said indeterminable category for unknown or undefined words.

107. The non-transitory computer readable medium with programming instructions as claimed in claim 106 wherein the step of ranking includes ranking said security sensitive words.

108. The non-transitory computer readable medium with programming instructions as claimed in claim 107 wherein ranking said security sensitive words occurs concurrently or prior to ranking said categories.

109. The non-transitory computer readable medium with programming instructions as claimed in claim 108 wherein said security sensitive words are subsumed in respective ones of said plurality of categories.

110. The non-transitory computer readable medium with programming instructions as claimed in claim 109 wherein the step of categorizing said security sensitive words includes matching said security sensitive words with a predetermined plurality of preexisting categories.

111. The non-transitory computer readable medium with programming instructions as claimed in claim 110 wherein each preexisting category of said predetermined plurality of preexisting categories has associated therewith preexisting data and the step of matching correlates said security sensitive words with said preexisting data in said predetermined plurality of preexisting categories.

112. The non-transitory computer readable medium with programming instructions as claimed in claim 111 including inferring additional security sensitive words from said respective ones of said plurality of categories.

113. The non-transitory computer readable medium with programming instructions as claimed in claim 112 wherein the step of inferring utilizes contextual and semantic rules to identify said additional security sensitive words.

114. The non-transitory computer readable medium with programming instructions as claimed in claim 113 including the step of searching one or more data sources from the group of data sources including the Internet, an intranet and an extranet, the step of searching used to infer said additional security sensitive words.

115. The non-transitory computer readable medium with programming instructions as claimed in claim 114 including assigning a differential risk rank quantifier to said security sensitive words which is different than said risk rank quantifier assigned to the subsumed category.

116. The non-transitory computer readable medium with programming instructions as claimed in claim 115 including: analyzing the presence of said security sensitive words in said target data, said analysis including a frequency analysis in said and a stochastic analysis in said target data; and altering said risk score output based upon said analysis.

117. The non-transitory computer readable medium with programming instructions as claimed in claim 105 including aggregating risk rank quantifiers representing said indeterminable words in said target data with said risk rank quantifiers associated with preexisting data found in said target data.

118. The non-transitory computer readable medium with programming instructions as claimed in claim 105 wherein the step of ranking includes ranking said security sensitive words.

119. The non-transitory computer readable medium with programming instructions as claimed in claim 118 wherein ranking said security sensitive words occurs concurrently or prior to ranking said categories.

120. The non-transitory computer readable medium with programming instructions as claimed in claim 105 wherein said security sensitive words are subsumed in respective ones of said plurality of categories.

121. The non-transitory computer readable medium with programming instructions as claimed in claim 105 wherein the step of categorizing said security sensitive words includes matching said security sensitive words with a predetermined plurality of preexisting categories.

122. The non-transitory computer readable medium with programming instructions as claimed in claim 121 wherein each preexisting category of said predetermined plurality of preexisting categories has associated therewith preexisting data and the step of matching correlates said security sensitive words with said preexisting data in said predetermined plurality of preexisting categories.

123. The non-transitory computer readable medium with programming instructions as claimed in claim 105 wherein said security sensitive words are subsumed in respective ones of said plurality of categories and the computer readable medium with programming instructions includes inferring additional security sensitive words from said respective ones of said plurality of categories.

124. The non-transitory computer readable medium with programming instructions as claimed in claim 123 wherein the step of inferring utilizes contextual and semantic rules to identify said additional security sensitive words.

125. The non-transitory computer readable medium with programming instructions as claimed in claim 124 including the step of searching one or more data sources from the group of data sources including the Internet, an intranet and an extranet, the step of searching used to infer said additional security sensitive words.

126. The non-transitory computer readable medium with programming instructions as claimed in claim 105 wherein said security sensitive words are subsumed in respective ones of said plurality of categories, the computer readable medium with programming instructions including assigning a differential risk rank quantifier to said security sensitive words which is different than said risk rank quantifier assigned to the subsumed category.

127. The non-transitory computer readable medium with programming instructions as claimed in claim 105 wherein said security sensitive words are subsumed in respective ones of said plurality of categories, the computer readable medium with programming instructions including: analyzing the presence of said security sensitive words in said target data, said analysis including a frequency analysis in said and a stochastic analysis in said target data; and altering said risk score output based upon said analysis.

128. A computerized method, operating on target data, of quantifying the risk of releasing security sensitive content represented by sensitive words, said security sensitive words not including malicious data but said security sensitive words consisting essentially of personal names, addresses, geographic terms, conceptual words and abbreviations derived from original security sensitive words, words in dictionaries and lists, personal identifying information, names associated with business entities, words which identify projects, tasks, tools, machines, systems and products and technical terms, societal groups or associations related to heritage, demographics, religion, race, ethnicity, or political beliefs, in said target data processed by a computer system, comprising:

categorizing each one of said sensitive content words into one of a plurality of categories which includes the use of a semantic check for synonyms and antonyms with a thesaurus and a dictionary for categorizing each one of said sensitive content words into one of a plurality of categories;

obtaining and compiling preexisting data for each category;

ranking said categories by risk and assigning a risk rank quantifier to each respective category and preexisting data subsumed therein;

comparing said target data to said preexisting data and generating a security risk score output representative of all rank quantifiers associated with preexisting data found in said target data to quantify the risk of releasing security sensitive content; and processing said target data through a security program based upon said security risk score prior to release of said sensitive content, the security program including at least one of extracting word data, encrypting word data or extracting and securely distributing word data in said computer system; and establishing an indeterminable category for unknown or undefined words which are not present in said preexisting data in the plurality of ranked categories;

ranking and assigning a respective risk rank quantifier to said indeterminable category;

modifying said risk score output with rank quantifiers representing said indeterminable words in said target data.

129. The method as claimed in claim 128 wherein the step of comparing said target data to said preexisting data compilation occurs after establishing said indeterminable category for unknown or undefined words.

130. The method as claimed in claim 128 wherein the step of ranking includes ranking said security sensitive words.

131. The method as claimed in claim 130 wherein ranking said security sensitive words occurs concurrently or prior to ranking said categories.

132. The method as claimed in claim 128 wherein said security sensitive words are subsumed in respective ones of said plurality of categories.

133. The method as claimed in claim 128 wherein the step of categorizing said security sensitive words includes matching said security sensitive words with a predetermined plurality of preexisting categories.

134. The method as claimed in claim 133 wherein each preexisting category of said predetermined plurality of preexisting categories has associated therewith preexisting data and the step of matching correlates said security sensitive words with said preexisting data in said predetermined plurality of preexisting categories.

135. The method as claimed in claim 128 wherein said security sensitive words are subsumed in respective ones of said plurality of categories and the method includes inferring additional security sensitive words from said respective ones of said plurality of categories.

136. The method as claimed in claim 135 wherein the step of inferring utilizes contextual and semantic rules to identify said additional security sensitive words.

137. The method as claimed in claim 136 including the step of searching one or more data sources from the group of data sources including the Internet, an intranet and an extranet, the step of searching used to infer said additional security sensitive words.

138. The method as claimed in claim 128 wherein said security sensitive words are subsumed in respective ones of said plurality of categories, the method including assigning a differential risk rank quantifier to said security sensitive words which is different than said risk rank quantifier assigned to the subsumed category.

139. The method as claimed in claim 128 wherein said security sensitive words are subsumed in respective ones of said plurality of categories, the method including: analyzing the presence of said security sensitive words in said target data, said analysis including a frequency analysis and a stochastic analysis in said target data; and altering said risk score output based upon said analysis.

* * * * *